(12) United States Patent
Carter

(10) Patent No.: US 11,360,658 B2
(45) Date of Patent: Jun. 14, 2022

(54) EVENT ORGANIZING SYSTEMS, SOFTWARE APPLICATIONS, AND METHODS

(71) Applicant: Miles Elliott Carter, Upland, CA (US)

(72) Inventor: Miles Elliott Carter, Upland, CA (US)

( * ) Notice: Subject to any disclaimer, the term of this patent is extended or adjusted under 35 U.S.C. 154(b) by 0 days.

(21) Appl. No.: 17/452,052

(22) Filed: Oct. 22, 2021

(65) Prior Publication Data
US 2022/0129143 A1    Apr. 28, 2022

Related U.S. Application Data

(60) Provisional application No. 63/198,516, filed on Oct. 23, 2020.

(51) Int. Cl.
| | |
|---|---|
| *G06F 3/04847* | (2022.01) |
| *G06F 3/0486* | (2013.01) |
| *G06Q 50/00* | (2012.01) |
| *G06F 3/0482* | (2013.01) |

(52) U.S. Cl.
CPC ........ *G06F 3/04847* (2013.01); *G06F 3/0482* (2013.01); *G06F 3/0486* (2013.01); *G06Q 50/01* (2013.01); *G06Q 2240/00* (2013.01)

(58) Field of Classification Search
CPC .. G06F 3/04847; G06F 3/0482; G06F 3/0486; G06Q 50/01
See application file for complete search history.

(56) References Cited

U.S. PATENT DOCUMENTS

| | | | |
|---|---|---|---|
| 2004/0172455 A1* | 9/2004 | Green | H04L 51/24 709/207 |
| 2007/0171046 A1* | 7/2007 | Diem | G06Q 10/00 340/539.13 |
| 2009/0254840 A1* | 10/2009 | Churchill | G06F 3/0481 715/753 |

(Continued)

OTHER PUBLICATIONS

"Create and Manage an Event," published online at www.facebook.com/help/572885262883136 at least as early as Sep. 13, 2020, available online at https://web.archive.org/web/20200913092846/www.facebook.com/help/572885262883136/, last accessed Oct. 15, 2021.

*Primary Examiner* — Seth A Silverman
(74) *Attorney, Agent, or Firm* — Law Office of Paul B. Johnson; Paul B. Johnson

(57) ABSTRACT

Event organizing methods include at least partially facilitating an at least intermittent communicative coupling between one or more servers and first and second computing devices. A map interface and main location indicator are displayed on a display of the first computing device. The one or more servers receive, from the first computing device, a selection by a first user of a main location for an event selected using one or more selectors displayed on one or more user interfaces displayed on the first computing device. A map and the main location indicator are displayed on a display of the second computing device. The main location indicator may include profile images of the first user and/or one or more invitees. In implementations the first user selects a parking location and/or an entrance location in addition to the main location. Event organizing systems include elements configured to facilitate the event organizing methods.

20 Claims, 13 Drawing Sheets

(56) References Cited

U.S. PATENT DOCUMENTS

| | | | | |
|---|---|---|---|---|
| 2012/0110052 A1* | 5/2012 | Smarr | ................... | G06Q 10/10 |
| | | | | 709/201 |
| 2012/0254804 A1* | 10/2012 | Sheha | .................. | H04M 1/724 |
| | | | | 715/834 |
| 2013/0024891 A1* | 1/2013 | Elend | ................. | G06F 16/9537 |
| | | | | 725/35 |
| 2018/0350144 A1* | 12/2018 | Rathod | ................ | A63F 13/216 |
| 2019/0268294 A1* | 8/2019 | Gao | ....................... | G06F 9/543 |
| 2019/0278579 A1* | 9/2019 | Brian | ................... | G06F 16/951 |

* cited by examiner

September 1st @ 8:00 PM — 402

John (8/23/21 7:15 PM):
I think we should do the dinner at Mario's Diner.

Maria (8/23/21 7:20 PM):
I like that place but they close at 10PM.

Donavan: (8/23/21 8:03 PM):
They don't let you in after 10 but their private karaoke rooms are open till midnight.

John (8/24/21 9:02 AM):
I'm not sure I can handle Donavan's singing :-)

Maria (8/24/21 10:03 AM):
Haha! Looks like Mario's works then.

TYPE: ──── 408

404 — 410 (clock icon) — 412 (send icon) — 406 (+5)

400

EVENT ORGANIZING SYSTEMS, SOFTWARE APPLICATIONS, AND METHODS

CROSS REFERENCE TO RELATED APPLICATIONS

This document claims the benefit of the filing date of U.S. Provisional Patent Application No. 63/198,516, entitled "Event Organizing Systems, Software Applications, and Methods," naming as first inventor Miles Carter, which was filed on Oct. 23, 2020, the disclosure of which is hereby incorporated entirely herein by reference.

BACKGROUND

1. Technical Field

Aspects of this document relate generally to systems, software applications and methods for organizing, planning and implementing events.

2. Background Art

Some event planning systems, software applications and methods exist in the art. For example, one or more social media platforms allow users to, either through a website interface or through a mobile application, create and edit events, including providing a name, time and place for an event, inviting one or more other users to the event, adding a background picture to the event invite, and so forth.

SUMMARY

Implementations of event organizing methods may include: at least partially facilitating an at least intermittent communicative coupling between one or more servers and a first computing device and between the one or more servers and a second computing device; initiating displaying, on a display of the first computing device, a map interface and a main location indicator; receiving at the one or more servers, from the first computing device, a selection by a first user of a main location for an event selected using one or more selectors displayed on one or more user interfaces displayed on the first computing device; and initiating displaying, on a display of the second computing device, a map and the main location indicator, wherein the main location indicator includes a profile image corresponding with the first user.

Implementations of event organizing methods may include one or more or all of the following:

The selection by the first user of the main location may include a dragging motion dragging the main location indicator to the main location on the map interface.

The method may include receiving, at the one or more servers, from the first computing device, a selection by the first user of a parking location for the event, wherein the parking location is distinct from the main location.

The method may include receiving, at the one or more servers, from the first computing device, a selection by the first user of an entrance location for the event, wherein the entrance location is distinct from the main location.

The method may include displaying, on the display of the second computing device, a parking location indicator indicating a parking location for the event and an entrance location indicator indicating an entrance location for the event, wherein the parking location and the entrance location are each distinct from the main location.

The method may include displaying, on the display of the first computing device, the map and the main location indicator, wherein the main location indicator includes a creator indicator indicating that the first user created the event.

The main location indicator displayed on the display of the second computing device may include an event title, a pointer, and an event date and/or an event time.

The main location indicator displayed on the display of the second computing device may point to the main location.

The main location indicator displayed on the display of the second computing device may point to an area on the map within which the main location is located in an undisclosed location.

The method may include displaying, on the display of the second computing device, a reveal time indicator, the reveal time indicator indicating a reveal time at which the main location will be disclosed, the method further including, after the reveal time has passed, the main location indicator pointing to the main location on the display of the second computing device.

The method may include displaying, on a chat interface displayed on the display of the first computing device, a request for an event time change and/or an event location change, along with one or more selectors configured to allow the first user to accept or deny the request.

The main location indicator displayed on the display of the second computing device may simultaneously display a plurality of profile images corresponding with a plurality of invitees of the event.

The method may include, in response to one or more user interface interactions, orbiting the plurality of profile images around the profile image corresponding with the first user.

The main location indicator displayed on the display of the second computing device may further display an indicator indicating a number of invitees of the event whose profile images are not shown by the main location indicator.

Implementations of event organizing systems may include: one or more servers or a portion thereof at least intermittently communicatively coupled with a first computing device and with a second computing device; one or more user interfaces, at least partly facilitated by the one or more servers or the portion thereof, displayed on a display of the first computing device and including: a main location indicator configured to allow a first user to select a main location for an event; a parking location indicator configured to allow the first user to select a parking location distinct from the main location and/or an entrance location indicator configured to allow the first user to select an entrance location distinct from the main location; one or more selectors configured to allow the first user to select one or more invitees for the event; and one or more user interfaces, at least partly facilitated by the one or more servers or the portion thereof, displayed on a display of the second computing device and displaying the main location indicator, wherein the main location indicator includes a profile image of the first user.

Implementations of event organizing systems may include one or more or all of the following:

The one or more user interfaces displayed on the display of the first computing device may include a visibility selector configured to selectively hide the main location from the one or more invitees until a selected reveal time.

The one or more user interfaces displayed on the display of the second computing device may display a selector configured to initiate requesting change of an event time to a requested time and the one or more user interfaces displayed on the display of the first computing device may include a chat interface displaying the requested time, an accept selector configured to automatically change a start time of the event to the requested time upon selection, and a deny selector configured to deny the event time change upon selection.

The one or more user interfaces displayed on the display of the second computing device may display a selector configured to initiate requesting change of an event location to a requested location and the one or more user interfaces displayed on the display of the first computing device may include a chat interface displaying the requested location, an accept selector configured to automatically change the main location to the requested location upon selection, and a deny selector configured to deny the event location change upon selection.

Implementations of event organizing methods may include: at least partially facilitating an at least intermittent communicative coupling between one or more servers and a first computing device and between the one or more servers and a second computing device; displaying, on a display of the first computing device, a map interface and a main location indicator; receiving at the one or more servers, from the first computing device, a selection by a first user of a main location for an event using one or more selectors displayed on one or more user interfaces displayed on the display of the first computing device; receiving, at the one or more servers, from the first computing device, a selection by the first user of a parking location distinct from the main location and/or an entrance location distinct from the main location; and displaying, on a display of the second computing device, a map and, on the map, the main location indicator; wherein the main location indicator includes a pointer pointing to the main location and/or to an area within which the main location is located in an undisclosed location; and wherein the main location indicator further includes an event title, an event date, and/or an event time.

Implementations event organizing methods may include one or more or all of the following:

The method may include displaying, on the display of the second computing device, a reveal time indicator, the reveal time indicator indicating a reveal time at which the main location and the parking location and/or entrance location will be disclosed, and the method may further include, after the reveal time has passed, displaying the main location indicator indicating the main location and displaying a parking location indicator indicating the parking location and/or an entrance location indicator indicating the entrance location.

General details of the above-described implementations, and other implementations, are given below in the DESCRIPTION, the DRAWINGS, the CLAIMS and the ABSTRACT.

BRIEF DESCRIPTION OF THE DRAWINGS

Implementations will be discussed hereafter using reference to the included drawings, briefly described below, wherein like designations refer to like elements. The drawings are not necessarily drawn to scale.

DESCRIPTION

Implementations/embodiments disclosed herein (including those not expressly discussed in detail) are not limited to the particular components or procedures described herein. Additional or alternative components, assembly procedures, and/or methods of use consistent with the intended event organizing systems, software applications, and methods may be utilized in any implementation. This may include any materials, components, sub-components, methods, sub-methods, steps, and so forth.

Implementations of event organizing systems, software applications (applications), and methods relate to systems, applications and methods configured to facilitate planning, organizing, and managing of events and gatherings. In implementations the systems, applications and methods disclosed herein help users to create and organize plans with increased efficiency and clarity. The types of events/plans can be any size (one to hundreds or more of attendees) and can be as simple as hanging out with one friend or a small meeting organized for work, or they can be as complex as a large party with many attendees.

Figure 1:
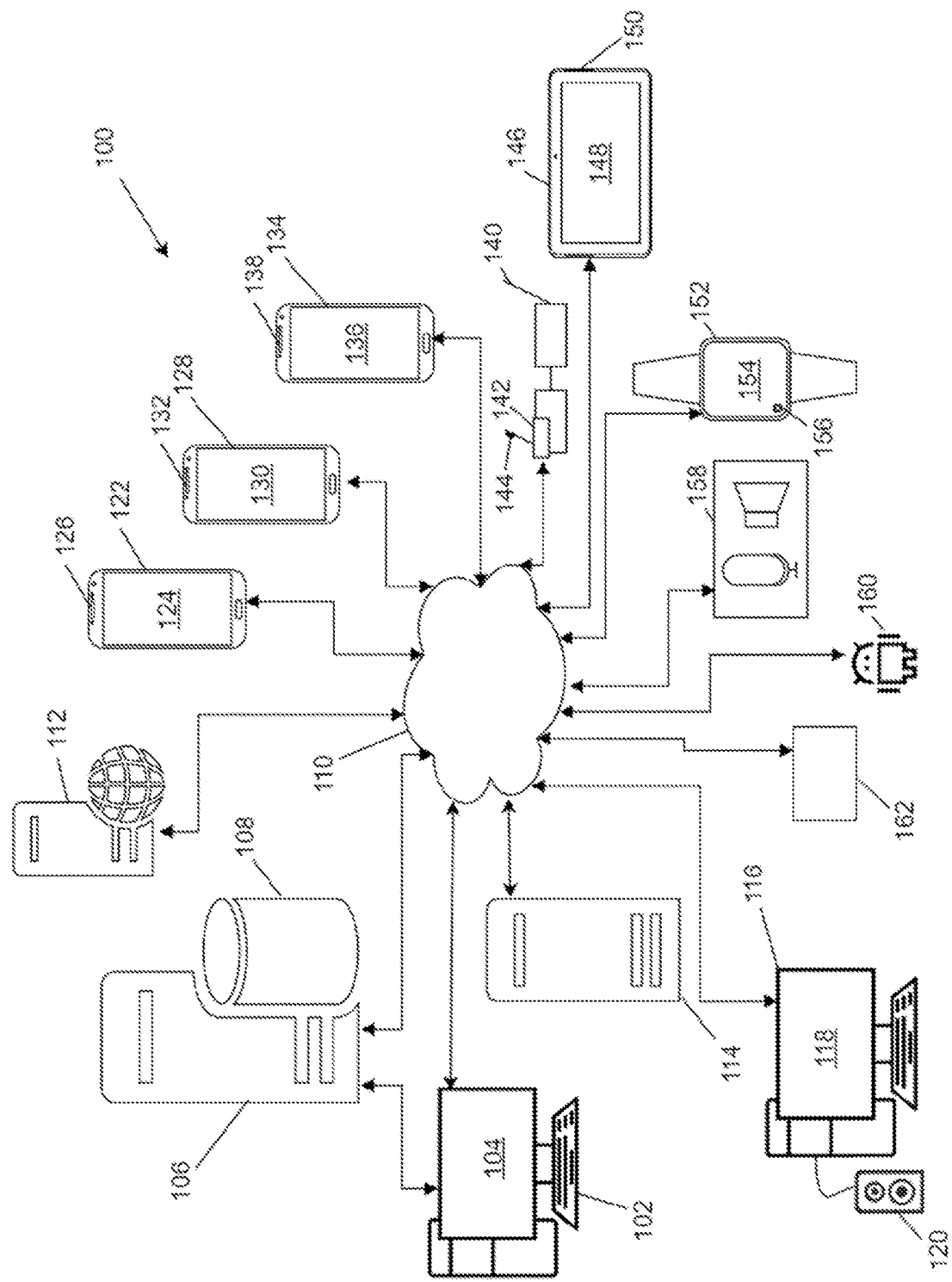
FIG. 1 shows an example implementation of an event organizing system.

Referring now to FIG. 1, an example of an event organizing system (system) 100 is shown. The system includes a number of computing devices. For example, computing device (device) 102 includes display 104 and is an administrator device (admin device). This device may be used by an administrator (admin) to populate a database (DB) 108, using database server (DB server) 106, with some of the elements of the system such as user profile and contact information, event details (name, date/time, location), and so forth, and to make changes to the database elements, set up and modify user interfaces to be used by end users, configure system settings in relation to various system servers and devices, and so forth. Changes may be made to database elements as end users interact with the system through a software application (described hereafter), such as saving/editing event details, profile and contact information, friends lists, and so forth.

In the implementation shown in FIG. 1 the admin device is coupled with the DB server directly, though also through a telecommunications network (network) 110 which may be, by non-limiting example, the Internet, though it could also be a local area network (LAN) in a more localized deployment of the system (such as a deployment used only within a work organization for organizing work meetings and gatherings and such). The admin device could also communicatively couple with the database/DB server through a web server (server) 112, such as by accessing a website using credentials. End users could also interact with the system through web server 112, such as by accessing a website, instead of through an installed software app. The admin device is shown as a desktop computer but could be a laptop, mobile phone, tablet, smart watch, smart speaker, smart glasses, or any other computing device allowing interaction with the system.

In implementations the admin computer, DB server, database, web server, and the like could all be implemented on a single machine (such as using virtual servers on a single machine) but in large network deployments there will more likely be a number of cloud-connected server racks used to implement these various elements as the number of users scales. For example AMAZON WEB SERVICES (AWS) server racks may be utilized to implement the database server, the database, the web server, other computing services, and so forth so that the number of users may be increased to very large numbers. In implementations the system may interact with third party servers/databases 114 to gather/receive information and store the same in database 108 to be used in the event planning/organizing methods.

System 100 shows a number of end user devices simultaneously communicatively coupled with the database 108 and other system elements via the telecommunications network, including a personal computer 116 having a display 118 and an associated microphone/speaker 120, a number of mobile phones 122, 128, 134 each having a display (124, 130, and 136, respectively) and microphone/speaker elements (126, 132, and 138, respectively), smart glasses 140 including a display 142 and microphone/speaker elements 144 (a representative example of this would be GOOGLE GLASS), a tablet 146 including display 148 and microphone/speaker elements 150, a smart watch 152 including a display 154 and microphone/speaker elements 156, a smart speaker 158 including microphone/speaker elements (representative examples would be GOOGLE HOME, AMAZON ECHO, APPLE HOMEPOD, and the like), a robot 160 (which may be a humanoid or non-humanoid robot and which may include microphone/speaker elements for user interaction), and any other human interaction device 162 which may include a microphone and/or speaker and/or visual display and/or user interface and/or any other user interaction elements by which a user can receive information and provide information/selections (by non-limiting example, user interfaces integrated in automobiles and airplanes, with or without touch screens, and any other human interaction device now known or hereafter discovered/invented).

The system at any given moment may have fewer or more user devices communicatively coupled with it, and each type of device may be scaled up to any number of users, so that FIG. 1 is a simplified diagram. In implementations, for example, there may be thousands of users, or more, simultaneously interacting with the system for event planning and organizing, and the systems and methods herein may interact with third party software programs/elements on the end user devices (which may in turn involve their own accessing of remote servers and databases and the like). For example GOOGLE ASSISTANT or APPLE'S SIRI may interact with the system so that the user can interact through speech and audio with the system, GOOGLE MAPS or another mapping platform may be used to integrate map details with the system, and so forth.

Not all of the elements shown in FIG. 1 may be used in every implementation. For example in a simple implementation the system could exclude end user personal computers, robots, smart speakers, smart watches, tablets, and smart glasses, and all end users could simply interact with the system using one or more mobile software applications installed on smart phones. In other implementations users could interact with the system using any device that is connected with the Internet and has a visual display, such as a personal computer, tablet, smart watch, and so forth. In other implementations the user could interact with the system through audio commands and speech, for example instructing a smart speaker, robot, or other human interaction device to set up an event through the system and receiving feedback and confirmation regarding the same through speech/audio of the smart speaker, robot or other human interaction device. Similarly, smart glasses or the like may be used to visually see user interfaces of the system, to provide audio commands and receive audio feedback, and so forth.

In some implementations all event organization, planning and management could be done through visual user interfaces, such as smart phone touch screen interfaces, with audio and other devices (smart speaker, smart glasses, robot, and other human interaction devices) used only to provide reminders or audio instructions to a user (such as driving directions and the like). In other implementations the system could be configured so that any type of interface (personal computer, mobile phone, tablet, smart glasses, smart watch, smart speaker, robot, other human interaction device) could be used to plan, organize, and manage events.

In implementations the system could have its own internal mapping functionalities to facilitate the placement of event location indicators and to provide directions and the like. In other implementations the system could interface with a separate mapping software/platform to provide such functionality. For example, the system could interact/integrate with GOOGLE MAPS using a GOOGLE MAPS application programming interface (API) or the like in order to overlay visual features over a map (or vice versa), such as event location indicators, and/or to provide directions, and so forth. Other mapping software solutions/platforms could be used, such as the WAZE navigation/mapping software, the APPLE MAPS mapping service, and so forth.

The mapping features may, in implementations, be included in many of the user interfaces of the system. It is also pointed out that, although not specifically shown in FIG. 1, one or more chat servers or the like may be included (or chat functionality may be facilitated using other system elements shown or not shown in FIG. 1) to facilitate chat functionality between users of the system.

Although the system shows only one of some of the elements, such as one administrator device, one database, one database server, one web server, one third party server or server rack, and so forth, these could be scaled up to any number of administrator devices, any number of databases, any number of database servers, any number of web servers, any number of third party servers or server racks, and so forth. Additionally, one or more application servers may be included to facilitate one or more software applications (for example one or more mobile software applications). The use of one or more databases and one or more database servers is only an example, as one or more data stores and/or data store servers could be used which are not technically databases or database servers.

Any of the servers, computing devices, human interaction devices, computers, phones, glasses, tablets, smart watches, smart speakers, robots, and the like may use one or more processors to implement the event organizing methods disclosed herein.

In implementations, when a user desires to create/organize a new event/plan, during event creation the user places a marker onto a map to indicate a location for the event (i.e., to indicate where the event creator wants to invite other users to meet or arrive). In implementations there may also be an option to include other location indicators, such as a location indicator to indicate an entrance location (for example if the venue has an entrance that is not noticeable on the map or would not be obvious to a user arriving at the venue), and/or a parking indicator to indicate an area at or nearby the venue where those invited can park.

Figure 2:
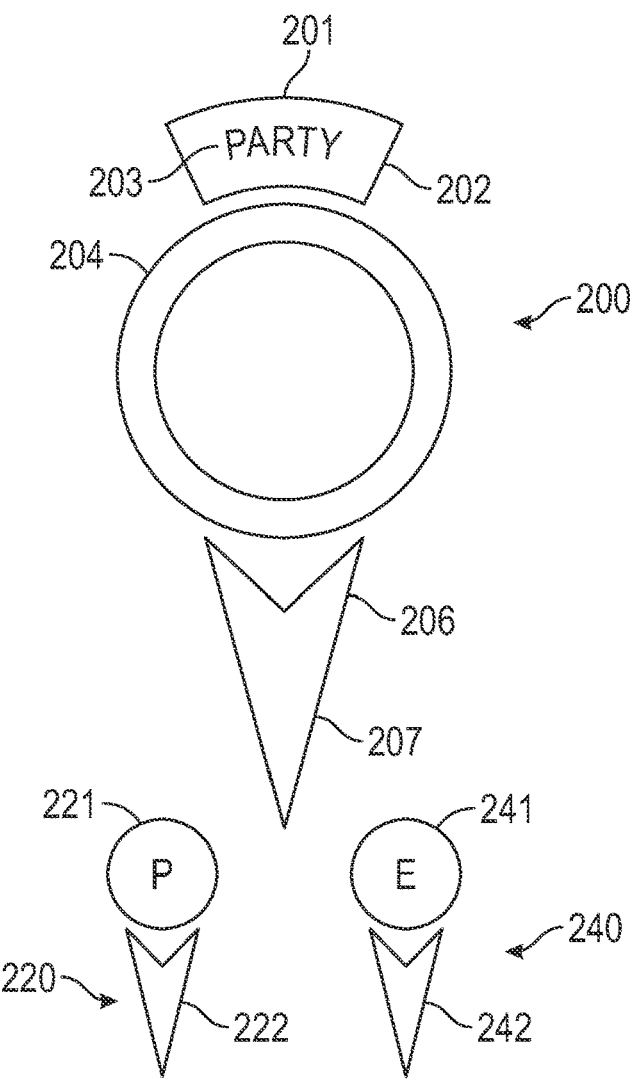
FIG. 2 shows example user interface elements of the system of FIG. 1.

FIG. 2 shows a representative example of such location indicators. Although not shown in FIG. 2, these location indicators would be overlaid onto, or shown adjacent to, a map. A main location indicator (indicator) 200 (having "PARTY" at its top) is shown in FIG. 2, along with a smaller parking location indicator (parking indicator) (indicator) 220 and entrance location indicator (entrance indicator) (indicator) 240 (having P and E letters therein, respectively). The parking location indicator includes a first portion 221 having the letter "P" therein (though the word "PARKING" and/or some other word and/or visual representation of parking could be used) and a second portion 222 which comprises a pointer. The entrance location indicator includes a first portion 241 including the letter "E" therein (though the word "ENTRANCE" and/or some other word and/or visual representation of parking could be used) and a second portion 242 which comprises a pointer. The functionality of these parking and entrance location indicators will be described in further detail later. For now, it is simply indicated that the user may drag the main location indicator onto a map to set or indicate a location of an event, and the user may then drag the P and or E location indicators to set or indicate the parking and entrance locations, respectively, as desired. There could be other secondary location indicators in implementations, and the parking and entrance location indicators are given herein only as representative examples.

In implementations the event creator does not have to place the extra location indicators (parking and entrance, or others) if the user does not want to. The placement of extra location indicators, however, could increase efficiency and/or reduce confusion in some implementations. In other implementations their placement may be unnecessary. For example, if the event is to be hosted at a home, there may be no need to provide a parking location or an entrance location. In some cases the user could provide only one extra location indicator, such as only a parking location, or only an entrance location, in addition to the main location indicator. The ability to use either, or both, or neither extra location indicators, simply provides flexibility and options for easy event planning.

Other functionalities could be facilitated using additional location indicators, as indicated above, and these are not limited to parking and entrance location indicators. If an event will start at one location and then move to another location (both within or near a main location), for example a speaking engagement held in one room of a business complex and a later luncheon held in another room of the same complex, sub-location indicators could indicate a first room, a second room, and so forth. In this example the main location indicator could be at the physical address of the business complex, the first sub-location indicator (marked with 1 or A or the like instead of P or E) could be at the room of the speaking engagement, and the second sub-location indicator (marked with 2 or B or the like) could be at the room of the luncheon, and so forth.

As indicated above, a map may be shown on a user interface of an end user device and the location indicators (main location indicator and secondary or sub-location indicators) may be shown adjacent to the map or overlaid on the map. They may all initially be shown adjacent to the map, such as below the map, with the user being able to drag each location indicator to a desired location on the map and drop it there to set or indicate the relevant location. The map is not shown in FIG. 2, but mapping interfaces are known in the art, so that the practitioner of ordinary skill in the art can envision how to overlay the location indicators onto a map or show them adjacent thereto.

When a user opens a software application on an end user device (or accesses a website using the same) to access the system 100 the system may, using global positioning system (GPS) information or the like, default to showing a map centered on the user's present location (if the user's GPS information, provided through the end user device, is available to the system). In other implementations the map may default to a "home" location of the user, such as the user's residence or workplace. In other implementations the map may default to the last location of an event created or attended by the user. In some implementations the user interface may include an address bar allowing the user to type in an address of a location, such as for placement of the main location indicator (though in implementations the user may still be able to drag the main location indicator for fine adjustments) and, once the main location indicator is placed, the map may center on the main location indicator. The user may then manually drag any other desired sub-location indicators onto the map, the map either remaining centered on the main location indicator or centering on the last placed (or last tapped/selected) location indicator. In implementations each sub-location indicator may also allow the input of an address to place the sub-location indicator (for instance a single tap, long tap or combination of taps, such as two quick taps, on the location indicator may bring up a user interface or window allowing the user to enter/type in an address). This would be useful for an event at a large multi-address complex where different sub-locations of the event are technically at different addresses, or for multi-part events held at multiple locations with different addresses. User interfaces for entering addresses are known in the art and do not need to be shown in the drawings for the practitioner of ordinary skill in the art to know how to implement them.

In implementations, when an event creator places a location indicator onto a location on the map, an option will appear allowing the creator to choose to temporarily hide the actual location from event invitees. This will be described in more detail later. The main location indicator 200 of FIG. 2 includes a first portion 201, second portion 204 and third portion 206. The first portion includes a displayed descriptor 203 within a text box 202 and in the example of FIG. 2 is located above the second portion 204. The descriptor can be, as non-limiting examples, a name or brief description of the event. The descriptor (name or description or otherwise) is customizable by the user/creator. The text box could be rectangular or have any other shape—in the drawings it has the shape of a truncated annulus or portion of an annulus, concentric with the second portion, that can expand or contract around the second portion as the text length increased or decreases, respectively. The text box can have other shapes as well, and the text box may receive any alphanumeric character, number or symbol—not just letters. The second portion can similarly have any other shape. In the illustrated examples the second portion has a circular shape with two concentric borders. In other implementations it could be a circle with only one border, or a square or rectangle with hard or rounded corners and with or without multiple borders, and so forth. In implementations in which the second portion is a shape other than a circle, such as a rectangle or triangle or other n-sided polygon or regular or irregular shape, the first portion may still be configured to wrap around the second portion as the number of characters within the text box increases.

In implementations the number of characters of the descriptor may be limited (for example in implementations the user can only use up to ten characters). The size of the text box may dynamically adjust to accommodate the number of characters used (though may stay the same for small names/descriptions, such as those which only include 1-3 characters). The limit of ten characters may be set to a different number in other implementations, such as lower than ten or greater than ten. In implementations the upper limit could be more than can be seen in the view shown on FIG. 2 (even if the text box would need to expand to wrap entirely around, or nearly entirely around, the second portion, which it may do in implementations), and in implementations in which the user adds more characters than can be seen in the text box the end of the text box may include ellipses ( . . . ) or some other visual indicator to indicate that the user needs to tap on or select the text box in order to see a full title/description. The full title/description may be shown in a pop-up window or other user interface. In implementations in which there is a character limit for the text box, spaces may count towards the character limit. The font size may decrease as a user increases the number of characters, to make it easier to show all the characters and/or to decrease an amount that the text box needs to expand, but a threshold smallest font size may disallow the characters from becoming so small that they are readable or difficult to read. In implementations in which a descriptor is used which is longer than the text box can facilitate, the text box may expand to some default width and show ellipses or the like but not wrap fully around the second portion (for example it may be set to only expand to one quarter of the circumference of the second portion, or half the circumference of the second portion, or so forth).

The descriptor shown in FIG. 2 is "PARTY," though other words or characters such as "LUNCH," "MEETING," "DINNER," "FOOD," and so forth, could be used—basically any description typed in by the event creator, and default options may be displayed to the creator and selectable for quick event creation.

Below the second portion of each location indicator is a third portion 206, which in implementations includes a pointer 207 which pinpoints a location on the map. A shape such as an arrow or spearhead, shown in FIG. 2 and in the other figures, may be used for the pointer, though a triangle, line, or other shape could alternatively be used.

Figure 3:
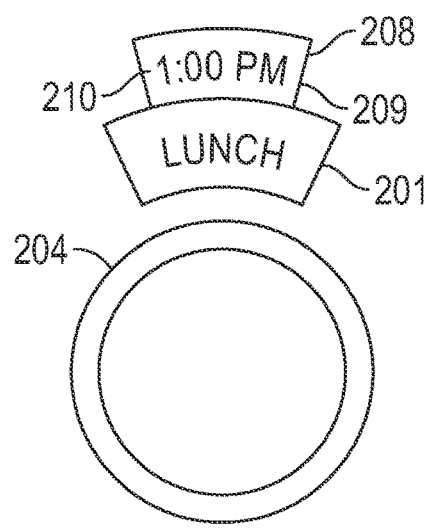
FIG. 3 shows example user interface elements of the system of FIG. 1.

Referring to FIG. 3, in implementations a location indicator may also include a fourth portion 208. The fourth portion of FIG. 3 includes a text box 209 and a descriptor 210. The text box and descriptors can have any of the characteristics and/or features of other text boxes and/or descriptors discussed herein. In the implementation shown the descriptor 210 is used to display an event date and/or time. For example, FIG. 3 shows that text box 209, which is displayed above (and contacting) text box 202, displays "1:00 PM." In implementations, if today's date is the date of the event, only the display time will show in text box 209, whereas if today's date is not the date of the event, the date and/or day may also show, for example "Mon. September 1 @ 1:00 PM" or the like. FIG. 3 does not show the third portion below the second portion, but only so other portions are shown more close-up.

Figure 4:
FIG. 4 is an example user interface of the system of FIG. 1.
Figure 4:
Figure 4:
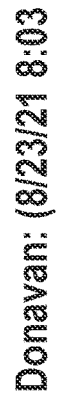
Figure 4:
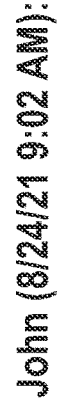
Figure 4:
Figure 4:
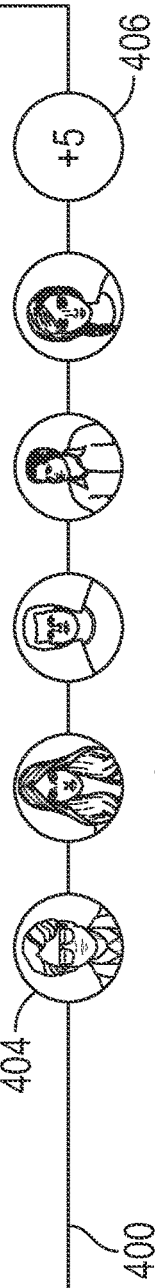

If a user selects the main location indicator 200 by tapping on it (or otherwise navigates to the event through a mobile app, website interface, or the like), an event details and chat interface (chat interface) (interface) 400 such as that representatively illustrated in FIG. 4 is shown. At the top of this interface is seen the date and time of the event in a text box 402 (the date may be shown on this interface even if today is the date of the event). Any of the descriptors previously described may also be shown (such as a title for the event). At a bottom of the interface are a plurality of profile images 404 of the invitees and/or the event creator (these may include actual photos or avatar images or default images/placeholders for users who have not provided or selected a photo or avatar image). In FIG. 4 these have circular shapes but in other implementations they could have any other n-sided polygonal or regular or irregular shape with rounded corners or otherwise. To the right of these profile images is a selector 406 which shows "+5" to indicate that there are five more invitees. The user may click on this selector to cycle shown profile images to show the next five or more, or selection of this selector may bring up a separate user interface (such as a popup or other screen) which allows the user to see all invitees). Selector 406 may not have a profile image therein (behind the "+5"), or it may, in implementations (for example it could include a profile image of one of the five additional invitees). Naturally, the characters within selector 406 change depending on the number of additional invitees (such as "+1," "+4," "+14," etc.). For events which have few invitees, all of the profile images 404 may be shown and selector 406 may be excluded or may be replaced by one of the invitees' profile images.

Any user can type characters in text box 408 to send a chat message that will be viewable to all users (in some implementations the user may be able to send a message only to a subset of users, or one user, if desired, by clicking on specific user images at the side or bottom of the interface). Several chat communications are shown by the users, representing user coordination related to the event. A user can click on any of the profile images at the bottom or side to open a profile page of the specific person chosen (which profile page may allow the user to send a message just to that user instead of to the group).

When a user types text/characters in text box 408 the "TYPE:" text may disappear and the user may type any desired text/characters. A "send" selector may be included to send the chat message to the other users in some implementations (though not shown in FIG. 4) and/or the text may send when a user selects an "enter" selector on his/her device (such as on a mobile device keyboard interface).

Still referring to FIG. 4, to the right of text box 408 are two other selectors. Selector 410 includes a clock icon and is a selector for proposing an alternate date and/or time for the event. If a user proposes an alternate date and/or time the proposed time change may appear in the chat history and the creator can choose to approve or disapprove the date/time change. Location change selector (selector) 412 includes a location indicator logo (pointer) and is a selector for proposing an alternate location for the event/gathering. If a user selects selector 412 a map window opens which allows the user to place a location indicator thereon (such as by dragging the location indicator and dropping it onto a location on the map) to suggest/request a new location. The user may also have the option of typing in an address and the map centering on that address so the user can place the pin there. Once the user requests a new location the request may appear in the chat history for the creator to approve or disapprove.

Requests for date/time changes and location changes do not have to be approved immediately by the creator. Placing the requests in the chat history allows invitees and the event creator to discuss the proposed change(s) before accepting the changes. In some implementations the proposed new date/time may remain pinned to a spot on the display to be permanently visible without moving (along with selectors to approve or decline the change) even as the user scrolls up or down through the chat history to see different parts of the chat conversation. In other implementations the proposed change (along with the approve/decline selectors) scrolls with the rest of the chat conversation. A proposed location change (map and/or approve/decline selectors) can similarly be pinned in place in the display or may scroll together with the chat conversation.

Figure 5:
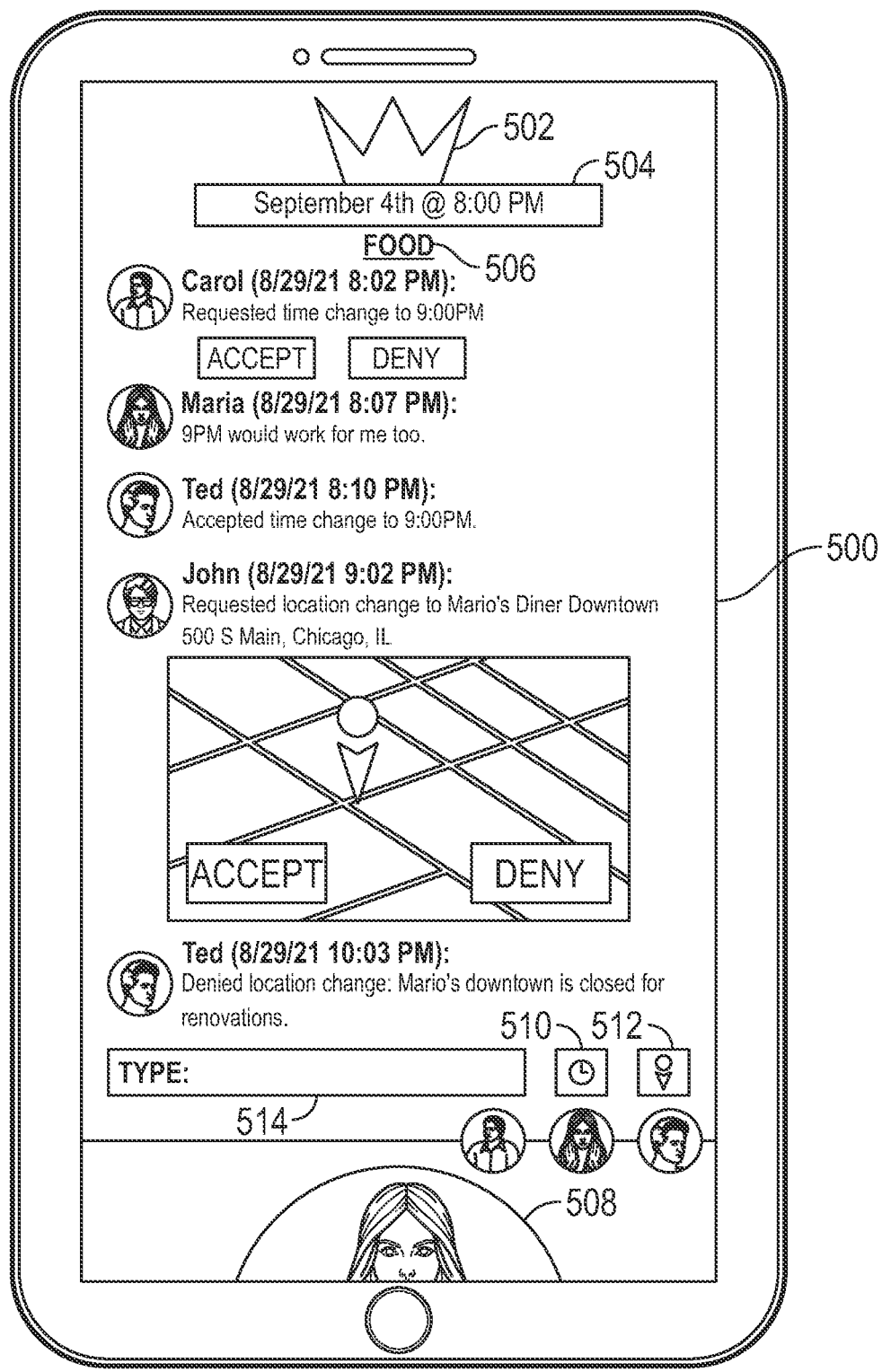
FIG. 5 shows an example user interface of the system of FIG. 1.

FIG. 5 shows another implementation of an event details and chat interface (chat interface) (interface) 500. Interface 500 is displayed on a mobile device. In implementations the entire (or much of the) background of the event details and chat interface 500 (or 400) may be a map showing the location(s) of the event (including location indicators), though this is not shown in FIG. 4 or 5 for ease of viewing the other elements, which in implementations would be superimposed over the background map and may be displayed in a high contrast or bold format to be clearly seen in front of the map (or the map may be dimmed or otherwise displayed in a way so that the chat elements are clearly visible). A creator indicator (indicator) 502 (in this case a crown) is shown at the top of interface 500 to indicate that this event was created by the user viewing the interface. A text box 504 including the date/time of the event is seen below the creator indicator, and below this a title 506 of the event is shown and underlined, above the chat text. In other implementations these may be displayed differently—for example the title may be shown not underlined, or in a separate text box atop the chat portion, and so forth. The crown shape is only one example of a creator indicator, in other implementations other icons or visual displays may indicate that the event was created by the user viewing the interface, such as a different shape, or a color outlining the event details/chat interface, or so forth. If the user viewing the event is not the event creator, the creator indicator (in this case the crown) will not be displayed. At the bottom of the interface of FIG. 5 a large profile selector (selector) 508 is shown. When viewed on an invitee's device the large profile selector may show the profile image of the event creator so the invitee can click on it to see the creator's profile. On the creator's interface it may instead show an invitee profile image (for example the first invitee invited, or the first to commit to the event, or a random invitee, as non-limiting examples).

In implementations chat interfaces 400/500 may display, in addition to the date/time information, a title/description and/or a location for the event.

In implementations the date/time change selector (selector) 510 and location change selector (selector) 512 are only available to those users who are not the event creator (the creator can also choose to disable these at any time, including disabling the placement of location indicators by other users, if the time and place are non-negotiable or if the creator wishes to reduce chat in the interface). In implementations the interface of FIG. 5 may display a settings selector (such as a gear icon) instead of and/or proximate the location of selectors 510 and/or 512. This may allow the creator to access and/or change the event settings/details such as date/time, main location indicator, sub-location indicators such as parking and/or entrance locations, description/title, etc. It may also allow the creator to add and/or remove invitees, cancel the event, automatically notify all invitees of cancellation or any changes, change the actual location from hidden to disclosed and vice versa, and so forth. The text box 514 for engaging in the chat may be wider on the creator's event details/chat interface since only one selector (the settings selector) may be shown to the right of it. FIG. 5 shows a requested time change at the top of the chat history (showing the proposed new date/time) and a requested location change (showing a mini-map with a location indicator/pin indicating the proposed location), and the creator can accept or reject either of these using the respective "ACCEPT" or "DENY" selectors. Each chat post is also seen to show a date and time of the post, text of the post (or describing a user's action), and a profile image of the poster. There are also user profile images displayed at the bottom of interface 500 and in instances a "+N" indicator could be displayed, as in FIG. 4 and having the same functionality as that described above, where N is replaced by a number indicating how many invitee profile images are not displayed. The "+N" selector may be displayed if there is not enough room to show all of the profile images at the bottom (for instance for an event that has many invitees), or simply to keep the number of profile images at the bottom to some threshold number for aesthetic purposes or simplicity. Any of the profile images may be selected to navigate to that user's profile and/or to message that user privately instead of in the group chat.

In FIG. 5 there is inline text in the chat conversation indicating that Ted, the event creator, accepted a time change and denied a location change. The chat conversation in FIG. 5 also still shows the requested time change and the requested location change with ACCEPT and DENY selectors, but in implementations after the event creator accepts or denies either requested change (such as by selecting the ACCEPT or DENY selectors) the respective selectors disappear. For example, after Carol's requested time change is accepted her post on Aug. 29, 2021 at 8:02 PM may still say "Requested time change to 9:00 PM) but the ACCEPT and DENY selectors may no longer be present, or in other implementations her requested time change post may be removed entirely. This may be the case for requested location changes as well, after accepted or denied the ACCEPT and DENY selectors and/or the map and/or the post making the request may be removed. When the event creator accepts or denies a requested location or time change, the event creator may be able to include a comment with the acceptance or denial. This is representatively illustrated in Ted's Aug. 29, 2021 10:03 PM denial of the location change, wherein Ted has added the explanation: "Mario's downtown is closed for renovations." A comment may also be made when accepting a request, and comments may also be made when making a time or location change, as well.

When a user selects a location indicator on a map interface (i.e., an interface for placing the location indicator in the first place to select the initial location of an event), the user may be able to type in an address, as has been discussed above, but other functionality may be available. For example, the user may be able to type any characters, such as APPLEBEES (with or without proper punctuation), and select search (or the map may dynamically auto-search based on recognizing what the user is typing), and the map interface may bring up a list of APPLEBEE'S restaurant locations (showing locations on the map). The map interface may dynamically change the search results based on any edits to the search text (for example if the user replaces APPLEBEES with DENNYS). The search and/or dynamic search functionality may include interpreting what a user is looking for even if the search terms include one or more misspellings, based on a data store of common misspellings or based on artificial intelligence or machine learning or the like. The user may select a venue from the list of search results, or select one of the locations shown on the map, to automatically place the location indicator at the address/location of the selected venue. This essentially allows the user to place the main location pin without manual dragging and dropping of the pin, and is useful if the default map location shown when the user opens the app (for example the user's present GPS location) is far from the location of the event that is being created. The same functionality may apply to any or all of the sub-location indicators.

Various interactions/functions may be facilitated using the main location indicator. In implementations if a user touches the main location indicator on a displayed background map, interface 400 or interface 500 will be shown in the center of the background map, partly obscuring the map behind it, but showing one of the event details and chat interfaces 400/500. The event details and chat interfaces 400/500 may expand to fit the screen size of the screen on which the user is viewing the interfaces. The text boxes on these interfaces may expand and/or font size may be dynamically reduced as needed to properly show the full text. In implementations a user may be able to zoom in on portions of this (or other) interfaces using a zoom capability native to the user device or using an in-app zoom feature.

The interfaces of FIGS. 4-5 representatively illustrate that every created event essentially sets up a group chat for all invitees and the event creator, so that the invitees and creator can chat, post pictures, post photos, post memes and GIFs, post icons, post other images, post videos, request time/date changes, request location or venue changes, and so forth.

Figure 6:
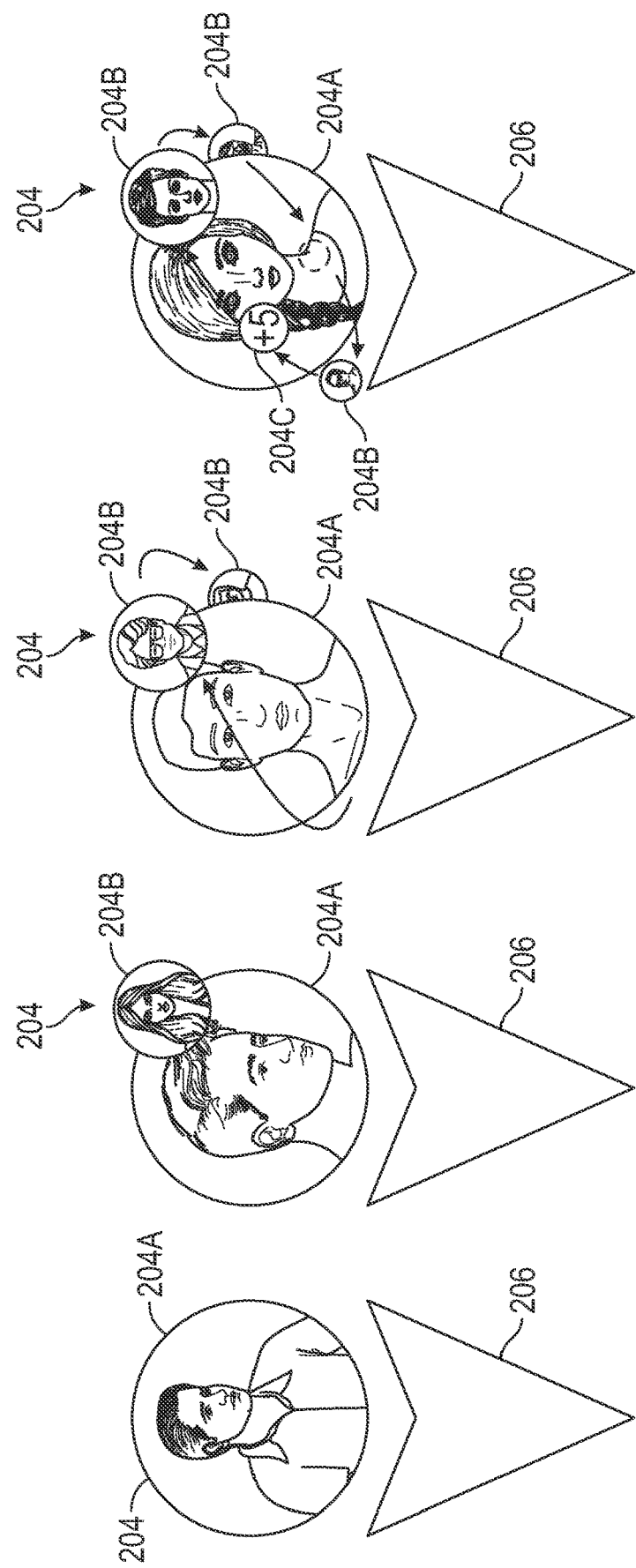
FIG. 6 shows example user interface elements of the system of FIG. 1.

Reference is now made to FIG. 6 which shows display options for the main location indicator and/or other indicators. The look of the main location indicator may change based on event details, and this is represented by four different example options in FIG. 6. For ease of viewing other elements, only the section portion 204 and third portion 206 of each main location indicator is shown.

As can be seen in FIG. 6, the main location indicator may display, in the second portion 204, a profile image 204A (or a default image if none has been uploaded) of the event creator if the location indicator is being viewed by one of the invitees (i.e., someone other than the event creator). If the location indicator is being viewed by the creator, profile image 204A may be a picture/image (or default image) of (or corresponding to) a random invitee. Profile image 204A may change to show a new random invitee each time the creator views it, or may stay the same, in implementations.

FIG. 6 further representatively illustrates that if more than one person (apart from the creator) is invited to the event, in addition to the profile image 204A shown in the large circle (or other shape, in implementations) of the second portion, smaller profile images 204B will be shown adjacent to, or overlaying, or orbiting profile image 204A, each one with a profile image of another invitee. Smaller profile images 204B may be circular (as shown in FIG. 6) but in other implementations they may have any regular or irregular shape.

Profile images 204B may be static in implementations, and in other implementations they may actually be "pushed" to orbit profile image 204A, going behind it and in front of it in orbit fashion. In other implementations the profile images 204B may automatically orbit on their own around profile image 204A (and can be stopped or pushed faster or in the opposite direction with user taps or swipes—the orbiting reverting to a steady orbit in an initial direction or any other direction after a predetermined time period of receiving no such user tap/swipe). Profile images may dynamically get smaller as they move towards the edge of and go behind profile image 204B, may grow larger as they come closer to the center of the front of profile image 204A, and so forth. Arrows representing example orbiting paths are shown in FIG. 6 only for illustrative purposes—in implementations the profile images 204B may orbit in either direction and the arrows themselves may be shown or excluded. The user may be able to touch one of the profile images 204B (or the path of orbit) and swipe and release in either direction to move the orbiting profile images in one direction or the other, and may hold the user's finger in place (or tap and hold) to stop the orbit to view any particular profile image. The user may tap and swipe then stop/hold to do a small/short rotation. The user may also be able to tap on any of the profile images 204A/204B to open one of the event details and chat interfaces 400/500 (or, in implementations, to open a profile for the chosen user and/or to send a private message or view a private chat corresponding with that user). For users who have not uploaded a profile image (or for all users) a user-selected name may be displayed on or adjacent to the relevant profile image, or partly wrapped around the profile image circumference, or so forth. The profile images 204A/204B may be circular, as shown in FIG. 6, or they could have any other regular or irregular shape such as square, rectangle, triangle, any n-sided polygon, any irregular shape, and so forth. In implementations the animation of movement of the profile images 204B is not displayed as an orbit around profile image 204A but rather the profile images 204B come into view on one side and disappear on the opposite side of profile image 204A during a swiping motion without displaying an orbiting visualization.

Although not shown in the images, the software application and/or website interface may include one or more account creation interfaces, profile creation interfaces, a log in interface, and so forth, as are common in other software applications and website interfaces, and may allow each user to include contact details, a profile image (such as a photo or a selected avatar image), a name, and so forth.

Referring back to FIG. 6, in implementations the profile image of the user viewing the main location indicator is not shown in any of the circles (or other shapes). If the number of invitees exceeds a threshold amount (in the example in the drawings, if the number of invitees exceeds four or five), an indicator/selector 204C may be included which either includes a profile image or not but which displays "+N" with N being the number of additional invitees whose profile images are not shown. The indicator/selector 204C may orbit the profile image 204A along with the profile images 204B or may otherwise have the same dynamic or static visualizations as the profile images 204B. The user may tap on indicator/selector 204C to either open up one of the event details and chat interfaces 400/500, or to replace the currently shown profile images 204B with profile images 204B of other invitees, or to open a user interface showing a list of all invitees and the creator, and so forth.

The leftmost main location indicator of FIG. 6 only shows one profile image, inside the main circle, as there is only one invitee (accordingly, two people total, the creator and the invitee). The second from the left shows one smaller circle but it does not orbit the larger circle. This is for an event with two invitees plus the creator (the user does not view himself/herself, so only needs to see the other two people attending). The third from the left shows smaller circles orbiting the larger circle. In this example this is for an event with three to six invitees, in other words 4-7 total people including the creator. The rightmost version shows the smaller circles orbiting the larger circle but also shows a "+N" smaller circle to indicate the number of people not actually shown in the orbiting circles. In this example this is for an event with seven or more invitees (in other words, 8 or more people including the creator). In implementations wherein not all invitees can be shown in the smaller circles and the +N circle is shown, the specific users shown in the smaller circles may be selected at random, or based on the order in which they were invited, and may or may not change when the user closes the app and reopens the app or reloads a page, and so forth. The numbers here could be changed in implementations—for example in implementations the orbiting function could be present even if there are only two invitees plus the creator (three total), or just two people total, and so forth. And, as indicated above, although the term "circles" is used, the profile images 204A/204B and indicator/selector 204C could have any shape other than a circle.

In implementations some of the above settings may be adjusted. For example in some cases the user viewing the main location indicator may have his own profile image shown as well. In implementations the specific threshold number of smaller profile images 204B may be adjusted to different numbers than those discussed herein. The images of FIG. 6 represent the location indicators that are shown on a map interface. FIGS. 4 and 5 show, at the bottom right, smaller circles which serve a similar purpose—they show the invitee and/or creator profile images and a +N circle may be included if the number is above a certain threshold. The +N indicator at the bottom right of the event details and chat interface 400/500 may be the same number as that shown in indicator/selector 204C, and the number of profile images shown at the bottom right of the event details and chat interface 400/500 may be the same number as those shown on the main location indicator itself as represented in FIG. 6.

Figure 7:
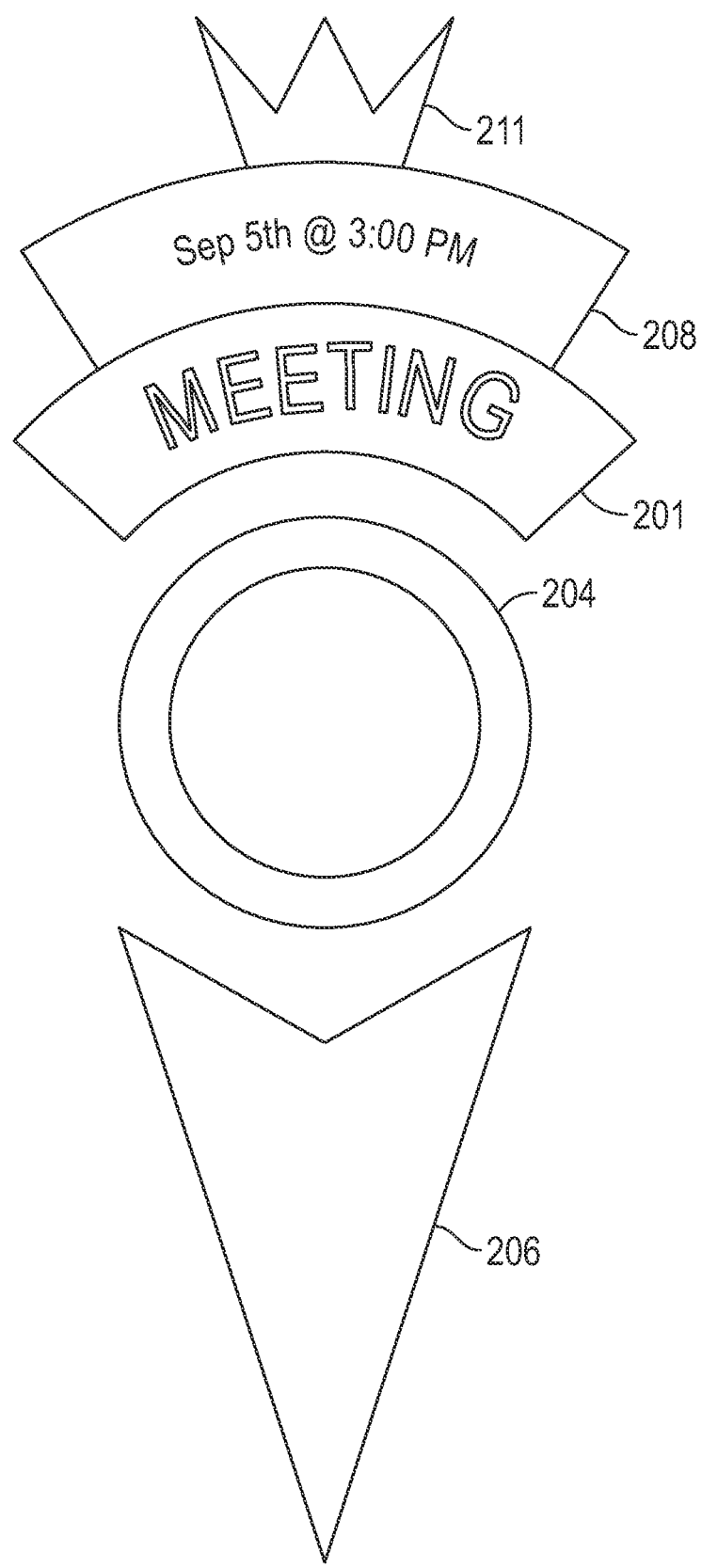
FIG. 7 shows example user interface elements of the system of FIG. 1.

FIG. 7 shows that the top of the main location indicator may display a creator indicator (indicator) 211 if the user viewing the interface is the event creator. If the user viewing the interface is not the event creator, the creator indicator may not be displayed. The creator indicator of FIG. 7 is a crown with a curved base and is situated atop the fourth portion 208. In other implementations the creator indicator may have any shape other than a crown, or the creator indicator may simply be an adjustment to any portion or all of the main location indicator so that a portion or all or a border of it is shown in a different/certain color (brighter or different than other main location indicators), and so forth. For example, the second portion could be highlighted with a yellow border, or shown with red text, if the event was created by the user viewing the event or its location indicator.

Figure 8:
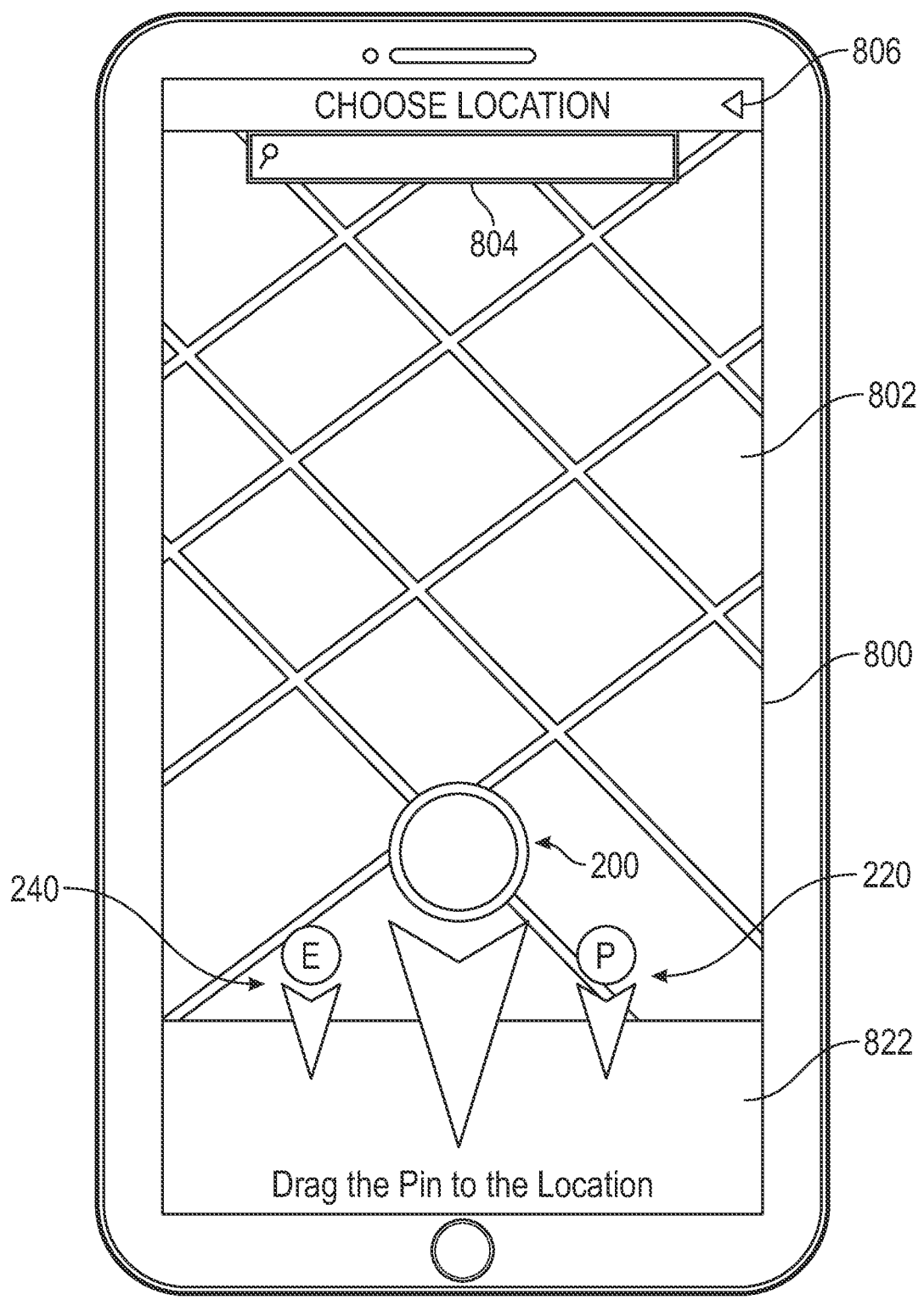
FIG. 8 shows an example user interface of the system of FIG. 1.

FIG. 8 shows a map interface (interface) 800 used to provide event location details. The user may arrive at this interface after selecting a location selector on a New Event interface (described hereafter) or after selecting a location change selector 412/512 in the event details and chat interface 400/500. The creator chooses a main location (or an invitee chooses a proposed main location change) by dragging the main location indicator 200 to a position on the map 802. The main location selection may also or alternatively involve the user using the search field 804 to type in (or begin typing) a business/location name or address, as described previously, then selecting a listed item in dynamically-produced search results—which location the user may be able to finely adjust by tap holding and dragging and then releasing the main location indicator 200. The user can also choose to add an entrance location indicator 240 for the entrance of the venue and/or a parking location indicator 220 for parking if the venue does not provide parking (or if parking is located some distance from the main location indicator). This is to make it easier for people to know where to park and/or where to enter for the event, but in implementations the parking location indicator and entrance location indicator are not required as the user does not have to place either or any of the sub-location indicators/pins down to proceed with posting the event (or for an invitee to proceed with suggesting a proposed location change, as the case may be).

FIG. 8 shows a simplified map 802, for ease of viewing other elements, but in implementations the map may be centered on the user's current location and may show addresses, street names, cities/towns, states, landmarks, and so forth depending on a zoom level. The user can move the map in any direction and/or change the map zoom using application-specific controls/command/selectors or controls/commands/selectors native to the mobile device on which the interface is shown (for example "pinching" the map to zoom out or an opposite movement to zoom in, tap holding and dragging the map to move it in any direction, and so forth). In implementations such functionalities may be built into the software app itself and not necessarily native to the mobile device or computing device displaying the interface. The search field 804 allows the user to type in a location, as indicated above, and could be displayed in other locations such as nearer the bottom or center of the map. The phrase "CHOOSE LOCATION" is shown at the top of the map screen. If the user selects a back selector (selector) 806 (left-facing triangle) at the right of the CHOOSE LOCATION wording the user may be brought back to a "new event" screen/interface. The back selector may instead be an upward facing triangle, a backwards arrow, the word "BACK," and so forth. The main location indicator 200 is shown in simplified format on FIG. 8, for ease of viewing the other elements, but may be displayed using any of the details of FIG. 6, in implementations. Indeed, in implementations a user may zoom out on a map interface of a software application to see main location indicators of a number of different events, each main event location including the details of the second portions of any of the FIG. 6 examples and/or including a first portion with a title or description, a third portion or pointer, a fourth portion with a date and/or time, and/or a creator indicator. In such implementations if the user viewing the event main location indicators is not a creator of any of the events the second portion 204 may include a profile image 204A showing the creator and other profile images 204B as described above.

Figure 15:
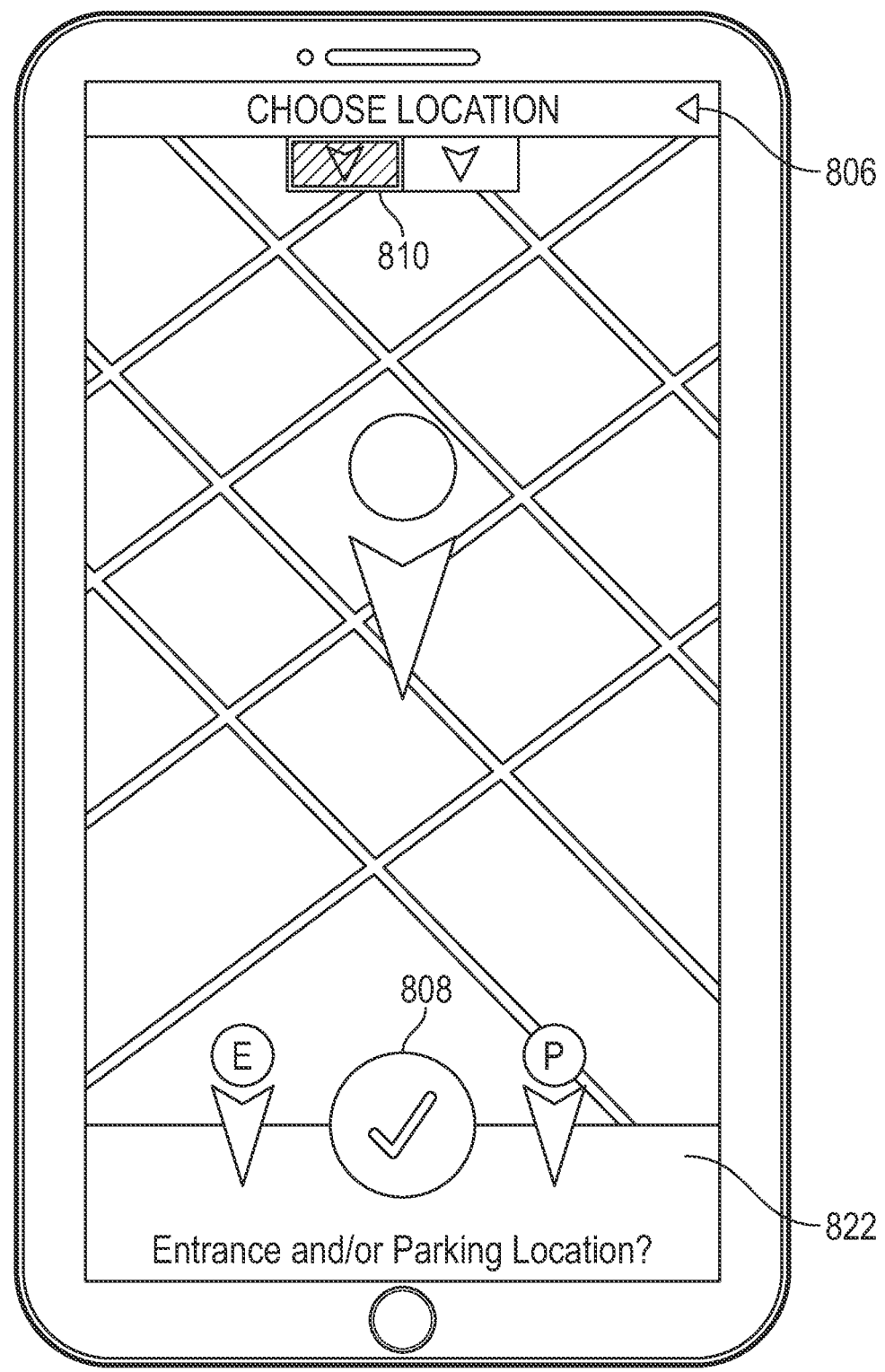
FIG. 15 shows an example user interface of the system of FIG. 1.

In implementations, when the user first lands on or views the map interface 800 to choose a main location for the event, the parking and entrance location indicators may be small and shaded or grayed (or shown in a lighter color) to indicate that they cannot be placed yet. After the user places the main location indicator, the parking and entrance location indicators (and/or other sub-location indicators) may get larger and/or lose their shading and/or appear darker to indicate that they may now be placed. Referring to FIG. 15, after the main location indicator is placed, a continue selector (selector) 808 displaying a checkmark or "DONE" or "CONTINUE" or the like may also be shown (such as in between the parking and entrance location indicators, as a non-limiting example), indicating that the user is not required to select sub-location indicators/pins before finishing the event creation. A simple example would be a circular selector having a checkmark therein. The user may be able to select the continue selector to finish creating the event without selecting any parking or entrance locations. Completing creation of the event may automatically notify invitees and set up the event details and chat interface 400/500 for in-app discussions related to the event. FIG. 15 also shows a visibility selector (selector) 810, which will be discussed further below.

Until the user has placed the main location indicator 200, a message may be shown underneath it, such as "Drag the Pin to the Location" as shown in FIG. 8. Another phrase may be used instead, such as "Choose Event Location" or "Drag or Search for Event Location" and so forth. When the main location indicator is placed and the two (or more) sub-location indicators become usable/selectable/draggable, the phrase may change to "Entrance and/or Parking Location?" (as in FIG. 15) or the like, or something else as desired by the admin of the app. It could also say "Optional" or the like to indicate to the user that the sub-location indicators are not required.

As has been described to some extent above, additional or alternative sub-location indicators could be used. A sub-location indicator with a question mark on it may be selectable, after placing the main location indicator, and may allow the user to set a sub-location indicator with a custom letter/number displayed in its circle, such as replacing the question mark with 1, 2, A, B, or so forth, and may have an associated description/explanation which may be input by the creator and viewable by users upon tapping the sub-location indicator. For example the user could create sub-location indicators titled "Location 1," "Location 2," and so forth. The titles could also include times. For example if the event starts at 7 PM, sub-location pins could be titled "Location 1—7 PM," "Location 2—7:30 PM," and so forth. Any configuration/characters may be used, as desired by a user.

Different main location indicator details have been described in different figures, but all of these details may be combined in the actual displayed main location indicator. For example, when the creator of an event is viewing the main location indicator for an event having a number of invitees above the threshold limit, and the creator is viewing the location indicator prior to the day of the event, the main location indicator may include: a first portion 201 including a title or description, a second portion 204 below the first portion and including a profile image 204A and a plurality of profile images 204B and an indicator/selector 204C, a third portion 206 below the second portion and including a pointer 207, a fourth portion 208 atop or above the first portion including a date and/or time, and a creator indicator 211 atop or above the fourth portion. The portions may be in any other positions relative to one another, in terms of placement, in implementations, and one or more may be excluded, in implementations, as selected/determined by an admin.

Although the profile images 204A, 204B are described above as showing profile images of the persons invited, in implementations they could instead show profile images only of persons who have "accepted" the invite or indicated in the app (or on a web interface) that they are attending.

Figure 10:
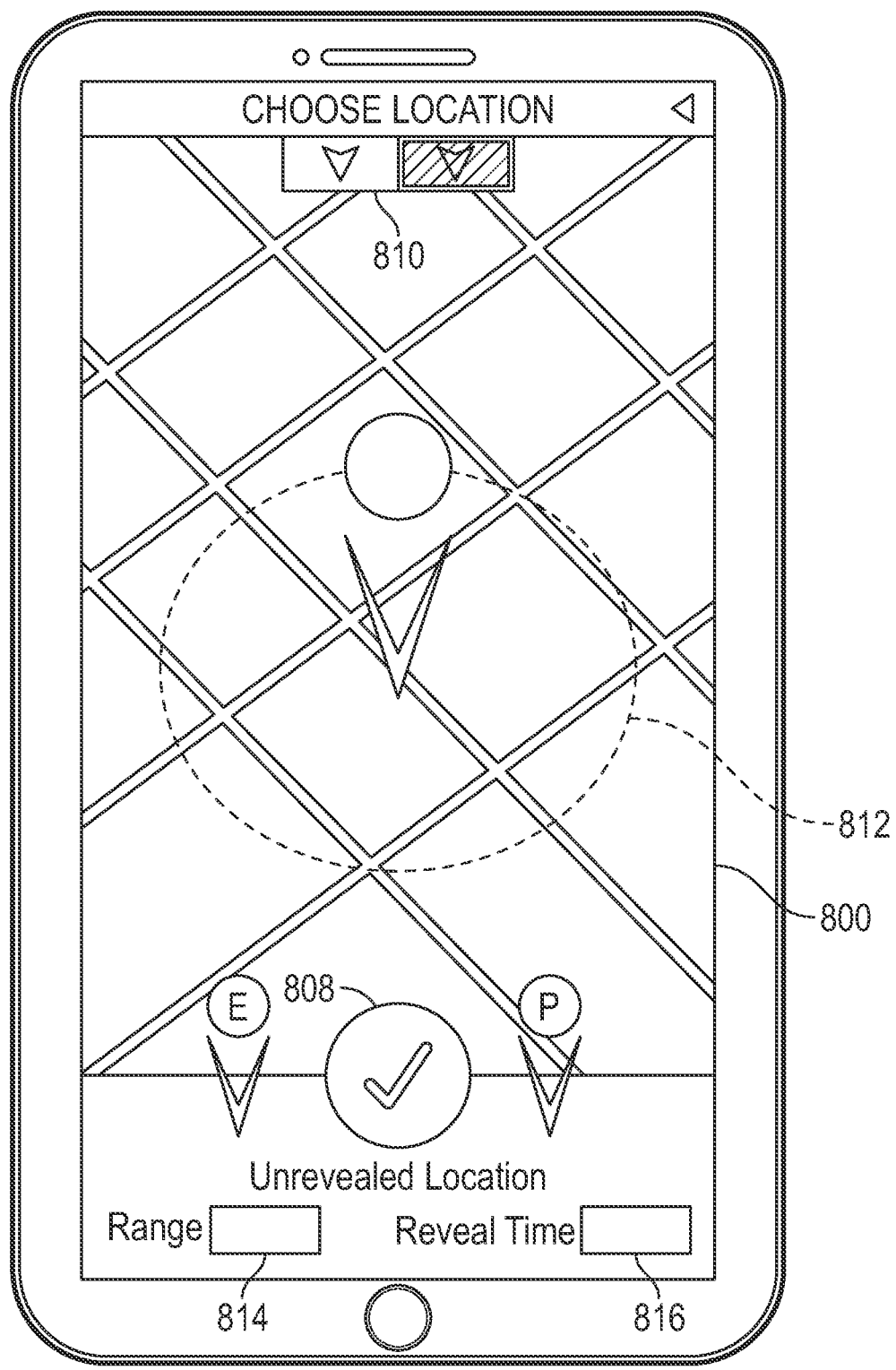
FIG. 10 shows an example user interface of the system of FIG. 1.

When a creator is creating an event and has already placed the main location indicator, a visibility selector 810 becomes selectable, as shown in FIGS. 10 and 15. The visibility selector can be left to a default "Visible" selection (as seen in FIG. 15 wherein the leftmost portion/pointer is grayed/darkened) or can be toggled to a "Hidden" selection (as seen in FIG. 10 wherein the rightmost portion/pointer is grayed/darkened). If the user selects the "Hidden" option the main location is represented is represented to all invitees as an area or radius 812, the true location being somewhere within the radius/area but undisclosed to the invitees until a certain time preset by the creator (or until the creator later manually discloses it through the app/website interface). As seen in FIG. 10, the pointer of the main location indicator in such implementations does not point to the actual main location but instead points to an area within which the main location is located, in an undisclosed location. This could, as a non-limiting example, be used for parties where the address is not to be shown until a later time, but still gives invitees the date/time of the event and an idea of the general area so they know how long they will have to travel to get to the event.

Figure 11:
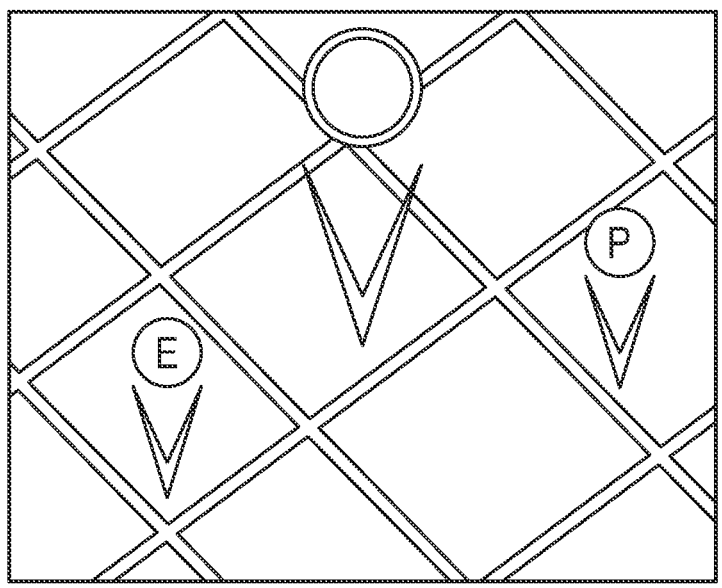
FIG. 11 shows example user interface elements of the system of FIG. 1.
Figure 12:
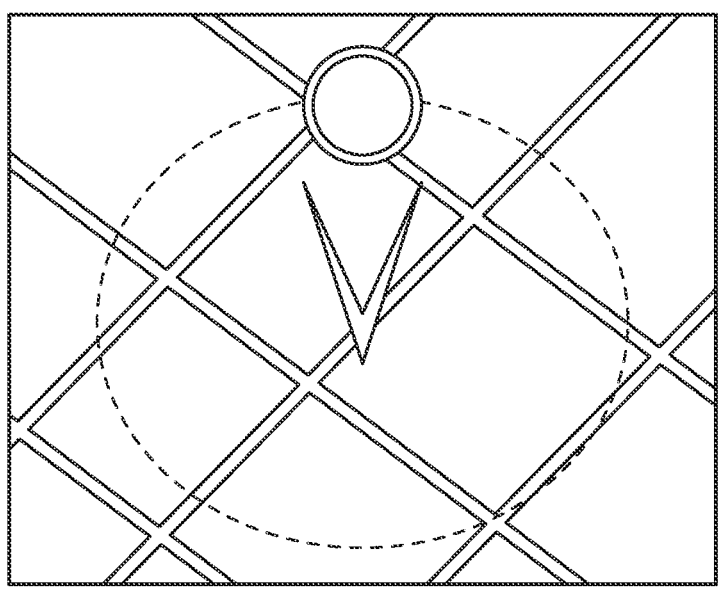
FIG. 12 shows example user interface elements of the system of FIG. 1.

This functionality is generally represented in FIGS. 10-12. FIG. 10 shows map interface 800 after the user has placed the main location indicator and after the user has toggled the visibility indicator 810 to the "Hidden" option. At the bottom left the user has a range selector (selector) 814 to select a range (for example in miles or kilometers or feet/meters or the like) and a reveal time selector (selector) 816 allowing the user to select the date/time the location will be revealed to invitees or attendees. When the creator selects a radius the system may randomly move the main location indicator and its radius so that the actual location is within the radius but so that the pointer of the main location indicator, centered within the range, does not point to the actual location, so invitees will not know the exact location but will know the general area. Both the entrance and parking location indicators (and any other sub-location indicators) may convert to a hidden look (i.e., they may be displayed differently in some way such as grayed out or in a color indicating they will be hidden, or using different shapes) so the creator will know that these sub-locations will be hidden as well. FIG. 11 shows what the locations will look like on the event creator's interface—showing the actual locations. FIG. 12 represents what the invitees may see on their end, with the display indicating that the event is somewhere in the displayed event radius, but not indicating exactly where therein. In implementations the entrance and parking location indicators are not shown to the invitees while the main location is hidden, and the invitees may be given an indication that the location pointed to by the main location marker on their end is not the actual location (such as text saying "actual location undisclosed but within this radius" or the like).

In implementations when the creator selects the range selector 814 the user may be presented with a plurality of selectable options such as a 0.5 mile radius, a 1.0 mile radius, a 3.0 mile radius, 5.0 mile radius, 10.0 mile radius, and so forth. Other distances may be selectable (or a custom distance up to a maximum distance may be manually input) in some implementations. The point will then choose a center point from a random coordinate within the selected radius in order to keep the real location undisclosed. In some implementations the creator may select to only show the city, town or municipality of the event, not a radius, or the main location indicator may by default be centered on the city of the event on the invitee's end, with no radius displayed.

Figure 13:
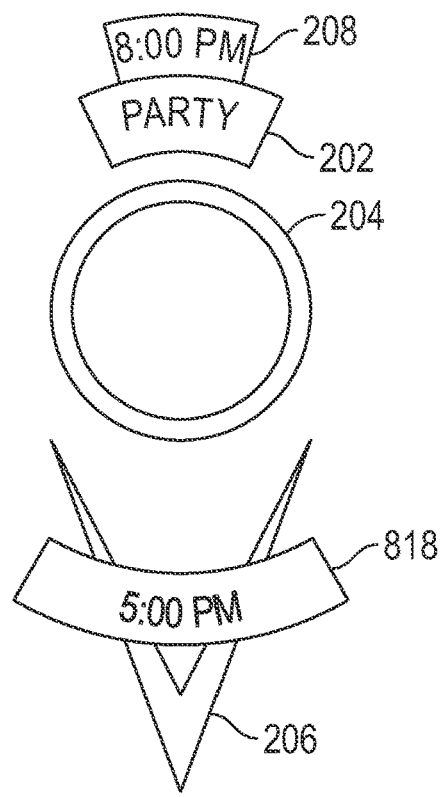
FIG. 13 shows example user interface elements of the system of FIG. 1.
Figure 14:
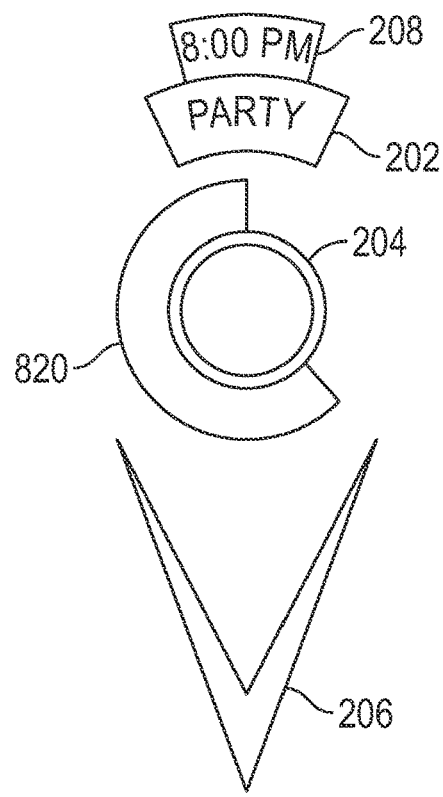
FIG. 14 shows example user interface elements of the system of FIG. 1.

In implementations the creator can disclose the location of a hidden event with the selection of a selector or button (a warning may be given to request confirmation, in case the selection was by accident). The creator can also set a preset date/time to automatically disclose the actual location, as described with respect to FIG. 10. When the date/time arrives, everyone in the invitee list (or confirmed attendee list, as the case may be) will be notified and shown the actual location. The selected reveal time accordingly must be before the event time or right when the event starts. A timer may be displayed on the creator and/or invitee interfaces, counting down to (or showing) the reveal time. Examples are shown in FIGS. 13-14. FIG. 13 shows a reveal time indicator (indicator) 818, indicating to invitees the date and/or time that the location will be revealed. In FIG. 13 it only shows "5:00 PM" because the event is on the same day so that no date is needed, but if the event is a day or two in the future the text box may say something such as "Mon. August 21 @ 5:00 PM" or the like to indicate both the date and the time. FIG. 14 shows an additional and/or alternative option wherein a reveal time indicator (indicator) 820 is displayed as a countdown timer wrapped around the second portion 204. The countdown timer in this example is an annulus at least partly wrapping around the second portion which gets smaller as the reveal time approaches (the actual reveal time may be shown in the event details and chat interface 400/500 when the invitee taps on the main location indicator, or in other implementations it could not be shown to the invitees on any interfaces). Other examples of reveal time indicators are possible—in some implementations a reveal time indicator could simply be a numerical countdown displaying for example the number of days, hours, minutes and/or seconds to a reveal time, or the reveal time indicator could include a horizontal or vertical bar which decreases in size as the reveal time approaches (or a horizontal or vertical bar which increases in size towards a displayed "finish" line or the like which will be reached at the reveal time). If the creator selects to manually disclose the location earlier than the reveal time this overrides the previously-selected reveal time and the reveal time indicator 818/820 then disappears from the interface(s). If the disclosure was an accident the creator can hide the actual location again in the settings for the event and the reveal time indicator will again be displayed to invitees. Once the location is disclosed, the main location indicator points to the actual location on the invitee interfaces. If the creator has selected parking or entrance or other sub-location pins previously, they will also become visible to the invitees at the reveal time.

FIGS. 10-14 show one way to show that the location is undisclosed—the pointer of each location indicator is shaped somewhat differently (a "V" shape instead of the arrow-like shape shown in other figures, such as FIG. 15, for disclosed locations). The main location indicator may also have a "light barrier" surrounding the area/radius selected by the creator, which lights up brighter when the creator or the invitee selects the location indicator, to indicate that the actual location is hidden. When the location is live/revealed the pointer shape may revert to the normal arrow-like shape shown for disclosed locations in other figures, such as FIG. 2. The location indicators shown in FIGS. 10-15 are simplified, and may include any other details described elsewhere herein for location indicators.

A "friends" feature may be included in the software app and/or website interface used by end users, and event invites may be sent to persons who have not yet installed the app. Functionality/features may be included to incentivize those who have not yet used the app to download/install and use the app. A friends list may be available on a main interface of the app, so the user can see how many friends the user has within the app, with an option to add/request a new friend using the friend's username within the app or by adding the person from a contact list on the phone (or a contact list to which the phone has access or is linked, for example a GOOGLE CONTACTS list may be linked with the phone and a contact within this list may be added/requested as a friend).

If a user adds a friend through a contacts list (instead of by username within the app) the app/system may send a link to the chosen contact which will redirect the chosen contact either to an app download page (such as an app download page on the APPLE STORE or GOOGLE PLAY STORE for example, if the contact does not have the app installed) or, if the person has the app installed, a friend invite may be sent to the person within the app, and in either case the person can accept or deny the friend request.

For companies or groups who want to distinguish between friends and followers, there may be an option for someone to just be a follower of a followed person. In implementations a follower can be invited to events created by the followed person, but followers cannot invite the followed person to events.

In implementations when someone gets a friend request, they can choose to make the requester a follower instead of a friend. Each user will have access to see who the user is friends with, who the user follows, and who follows the user.

Figure 9:
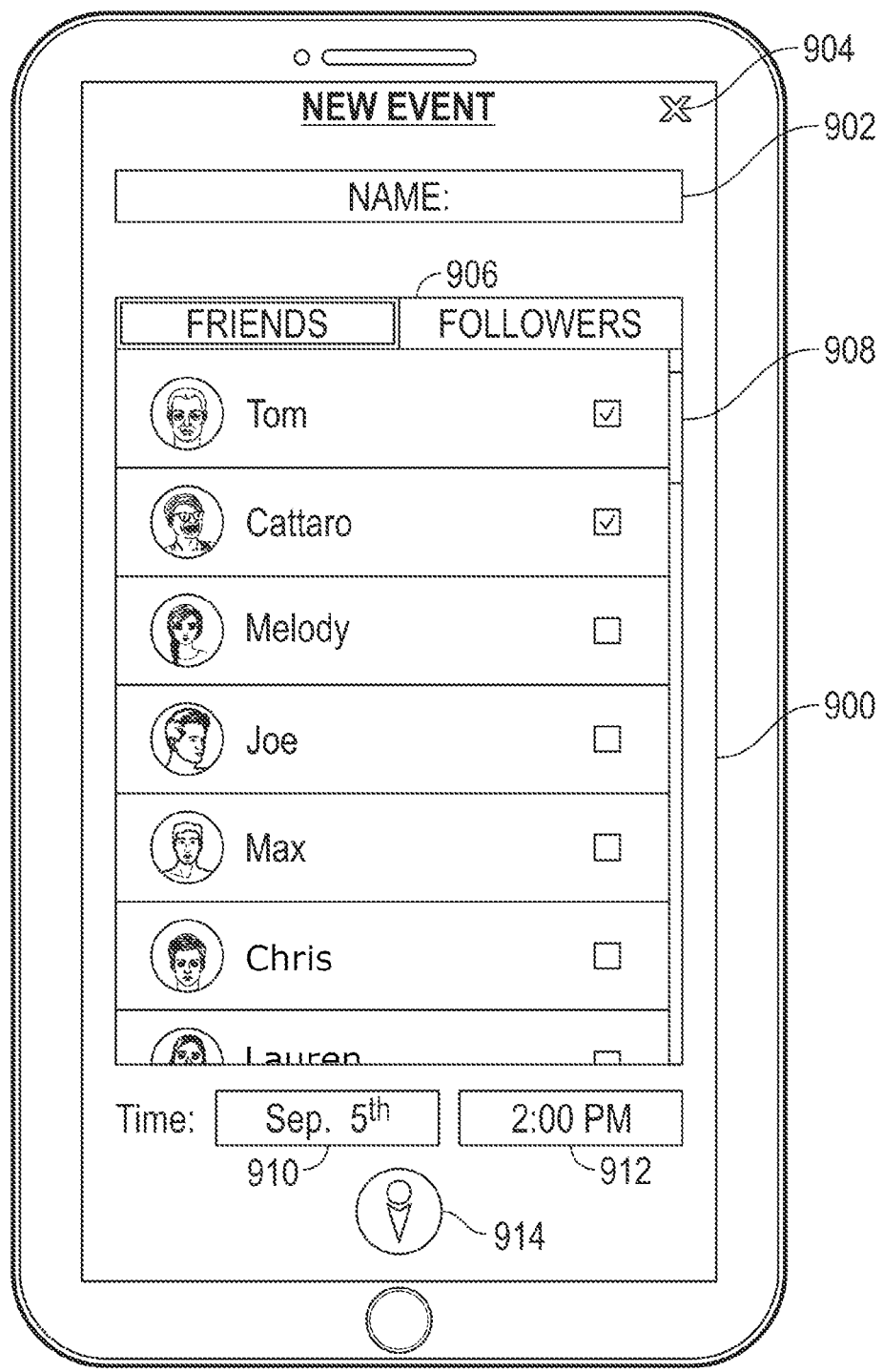
FIG. 9 shows an example user interface of the system of FIG. 1.

When a user is creating an event the system/app may distinguish between followers and friends as they may be split into two separate lists, with a button or selector to select which to show (so there will only be one list on a screen at a time). This is represented in FIG. 9, which shows a new event interface (interface) 900. In implementations the new event interface may be reached by selecting a new event selector or the like from a home page/interface. The user can type an event name in the name field (field) 902 (the "NAME:" text disappears when a user clicks therein, and the user can type whatever the user wants). A close selector (selector) 904 allows the user to close the new event interface and return to the home page/interface. The list of people to invite can be toggled between friends and followers using selector 906, with the user tapping either the left "FRIENDS" tab or the right "FOLLOWERS" tab—the currently selected tab may be colored, shaded or otherwise displayed differently to show that it is the tab being displayed. For example the non-displayed tab could be shown in light gray and the other in a bolder or darker or brighter color. In FIG. 9 the friends list is selected so the friends tab is outlined and may appear in a different color. A scroll bar 908 may appear when the user scrolls the list of friends/followers and disappear or fade away a few moments after the user stops scrolling—before the scroll bar disappears the user may touch and move it up or down to scroll up or down the list faster. Each friend or follower listed may show the person's profile image and name along with a checkbox to indicate whether the friend or follower is invited. In implementations a checked box means invited and unchecked means not invited. The user may select a date and time on this interface using selectors 910 and 912. In some implementations the date and time could be added using a single selector, but in FIG. 9 selector 910 is used to enter or select a date and selector 912 is used to enter or select a time. In implementations a search functionality may be provided to search for specific friends/followers (this is useful if the user has a lot of friends/followers). When the user has finished selecting friends/followers to invite and the date/time and name of the event, the user may select the location selector (selector) 914 at the bottom of the screen (which includes the appearance of a location indicator) to bring the user to a map interface, such as map interface 800, to place the location indicators to select the location(s) for the event. In implementations the "NEW EVENT" text at the top of interface 900 may be itself editable to provide the name or title of the event and the name field 902 may be a search field for inputting a friend or follower to search for, with the populated friend/follower list dynamically changing as text is entered and changed in the name field 902.

Although not specifically shown in FIG. 9, the creator will have the option of requesting to send the invite to a person not on the friends/followers lists, allowing the creator to send an invite to one or more of his/her contacts in the phone contacts list or other linked contacts list. Similar to the friend request sending feature, this may send the contact either a link to an app download page for the app or to the event invite if they already have the app installed. A selector is not shown for sending the invite to a contact, but for example there could be a selector that is rectangular in shape and the same size as the profile list items (Tom, Joe, Melody) of FIG. 9. This selector could be displayed within the list (or at the bottom of it, above the time/date selectors) and could say something like "Invite from Contacts" or "Friend in contacts?" or the like. The "Invite from Contacts" selector could alternatively be at the bottom of the list when you scroll all the way down, because the user may wish to scroll down the list adding in-app friends first, and if the user gets to the end of the list and still wants to invite one or more additional people, the one or more additional people would need to be invited from contacts or by email address or phone number or the like (which may be options instead of using a contacts list directly). This is for efficiency, since it may be easier and quicker to invite in-app friends than to invite people from contacts. If the user does not have enough in-app friends then the "Invite from Contacts" selector may be visible without scrolling. In some implementations, however an "Invite from Contacts" may be pinned to the top of the list or otherwise visible regardless of where the user has scrolled to within the list itself. Selecting the "Invite from Contacts" selector may open up the default contacts list of the user device (and/or may show multiple selectable contacts lists) to allow the user to navigate to and select the desired contact. This could be similar, for example, to the DISCORD software method for sending invite codes to other users. As described above, sending an invite using a contacts list (or using an email or phone number) may require the invitee to install the app (if they haven't already done so) and to accept a friend request (or become a follower or followed person) so that, once the person has been invited once from a contacts list or the like, thereafter they can be invited from the friends or followers lists directly.

In implementations friend and follower names can include more than just alphanumeric characters—for example a friend or follower name could include an emoji or other image/illustration (either input by the user as a custom name for the friend/follower or input by the friend/follower directly).

FIG. 8 shows a user interface that is displayed when the user selects the location selector 914 of FIG. 9. Referring to FIG. 15, after the main location indicator is placed, the visibility selector 810 may drop down from near the top of the screen to allow a user to select between disclosed and hidden (the shaded one is selected—in FIG. 15 the location is disclosed). In implementations the back selector (selector) 806 is an upward-facing triangle until the main location indicator is placed and rotates to a left-facing triangle after the main location indicator is placed. While an upward-facing triangle the selector may be selected to return to the new event interface 900, and while a left-facing triangle the selector may be selected to undo the last action (such as undoing the placement of the main location indicator or another location indicator). Multiple location indicator placements may be undone in this way, in implementations. The user may press and hold on a location indicator to "grab" it and may drag it to a desired location. If dragged all the way down to the bottom of the screen (or at least below the bottom edge of the map 802) it moves back into the "hot bar" 822 and the checkmark or continue selector 808 disappears (being replaced by the main location indicator, as in FIG. 8). The triangle at the top right then rotates back to an upward facing direction, and if the user selects the triangle the user is brought back to the new event interface 900. After the main location indicator (or any other location indicator) is placed on the map, the user can still zoom in and out on the map and/or move to different areas of the map such as by swiping in any direction on the map interface. In FIG. 15 the map interface is shown behind the main location indicator. Once the user places the main location indicator (or any other location indicator) on the map the user may move the location indicator to any other location by grabbing and dragging it again (pressing on the location indicator and moving it with a movement of the finger). After placement of the location indicator the user may at any time select the continue selector 808 to finish the event creation, which makes the event visible to all those invited and sends a notification to each invitee. As discussed above, the invitees may have the option to indicate whether they can/will attend, and the creator may be able to view such details on a creator interface (other invitees/attendees may also be able to view such details).

Figure 16:
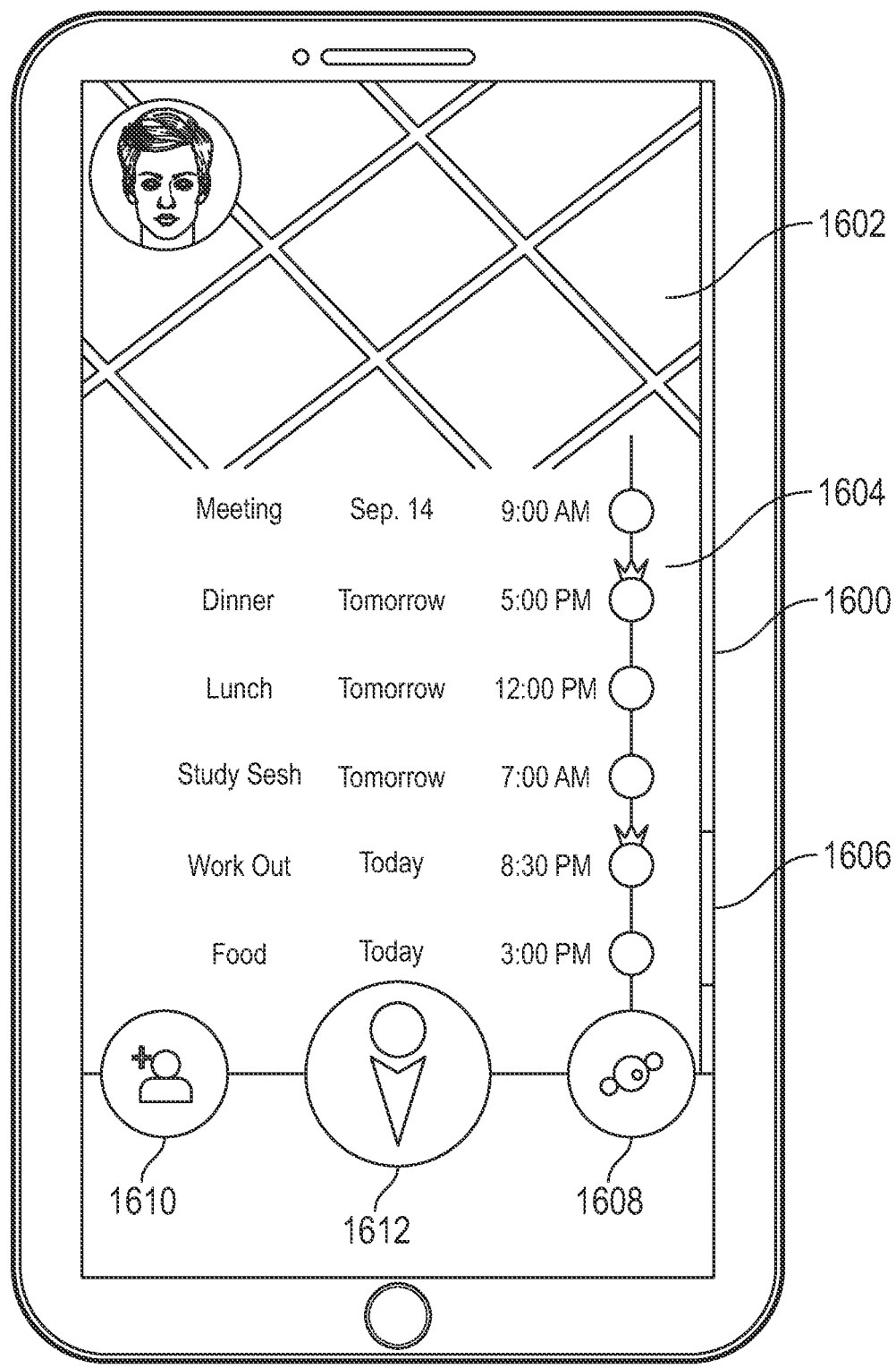
FIG. 16 shows an example user interface of the system of FIG. 1.

FIG. 16 shows an example home interface (interface) 1600 that may be shown to a user after creating a profile. A map 1602 is shown above other elements, but in implementations the map is a background image over which the other elements are superimposed. The map may be centered on the user's current location (or a home location or some other location). Main location indicators may be on the map itself, showing locations of upcoming events and pointing to the event locations. The user's profile image (or a default image if no photo/image is uploaded) may be shown at the top left (or other location) and if the user selects it the user may be brought to the user's profile to edit a name, contact information, profile image, and so forth. An app logo may be shown on the home screen, although none is shown in FIG. 16. An events list (list) 1604 may list upcoming events. In this example the list displays, for each event, the event title or name, event date, event time, and an icon showing a circle (for events the person has been invited to) and the circle plus creator indicator (for events the user has created). These circles may display user profile images in a similar manner to the location indicators described previously (such as the profile image of whichever user created the event). They could also be other shapes instead of circles, such as squares or triangles or any other regular or irregular shape, and/or could include any of the features described with respect to FIG. 6. The user may press or click on any of the round icons (and/or on the text of the title/date/time) to center the background map on the location of the selected event. As indicated, the map may be a background of the list so that the spaces between the list elements show the map behind, with the text and other elements of the list displayed on such a font or color or style that they are clearly visible and distinguishable on top of the map, the map not interfering with easy viewing of the list elements.

In implementations the event list in FIG. 16 is prioritized from nearest starting time to farthest starting time. A scroll bar 1606 allows the user to scroll the events list up and down (event images and names/dates/times may fade out when they are too far up or down the list). The user may also scroll by swiping the list itself up or down, as well. The user may toggle the events list on this interface opened/closed by selecting the list selector (selector) 1608 (which is in the shape of a circle with orbiting smaller circles, similar to FIG. 6 images). When the events list is toggled open the map background may be dimmed or grayed or otherwise displayed in such a way that the text and details of the events list may be seen more clearly. Or, in other implementations, the map may not be shown behind the list, but only above or otherwise around the list (as in FIG. 16). The user may select a friends selector (selector) 1610 open a friends/followers list/interface, whereon the user may respond to friend/follower requests (making each requester a friend or follower), request friends, request followers, remove friends, remove followers, remove followed persons, and so forth. The user may select the new event selector (selector) 1612 (which has the appearance of a location indicator, though in other implementations it could have any other appearance) to open the new event interface 900 to create a new event. In the implementation shown in FIG. 16 this selector is larger than the other selectors to either side, though in other implementations they could be sized similarly or some other configuration could be used.

Any implementations of location indicators could include color elements, shading, and so forth. For example a main location indicator could have one color scheme, parking and entrance location indicators could have another color scheme, and so forth. In other implementations location indicators could have different color schemes for different users. For example one color scheme for events created by the user, another color scheme for events by a first friend or follower or followed person, another color scheme for events by a second friend or follower or followed person, etc. Or there could be one color scheme for events created by the user and another color scheme for all events created by anyone else.

In implementations the system could interface with other software applications. For instance, the app could interface with a user's FACEBOOK events to automatically place those events on the events list 1604 and on the map 1602. The system may automatically determine the creator of such events and those invited or marked as attending and use their FACEBOOK profile photos/images on the main location indicator for the profile images 204A and 204B and to determine whether to show the indicator/selector 204C and what number to use for the +N text. While some of these may be autopopulated, including title/name, date/time, and so forth, the user may nevertheless make adjustments in the app, such as adjusting the main location a bit and adding parking and entrance locations, editing the title/name or date/time, and so forth. System settings within the app may allow the user to sync FACEBOOK EVENTS (or events from any other social media or social networking platform or other platform) or not to sync/add them. In implementations the system may be set to automatically sync events from specified social media or other platforms, but the user may edit individual events and/or delete individual events, and the system interfaces may include one or more selectors to select to override syncing for those individual events so that the user's manual selections in the app or manual deletion of individual events overrides the default syncing. In other implementations the user's editing of anything on an individual event, or the deletion of an event, in the app, automatically turns of syncing for that event from the associated social media platform/system.

In implementations the app could be used as a personal reminder system/method. For example a user could set up an event or task and include a checklist of errands to do, but not invite anyone to the event. The event may not automatically set up a chat function, since there are no other users to chat with, and the location indicator may display the user's profile image (in the second portion) along with the creator indicator, and no other profile images may be displayed, to indicate to the user that this is an event only for the user himself/herself. Because there may be no chat function, if the user taps on or selects the location indicator it may just zoom in on the map instead of opening a chat window.

Any of the text portions of the user interfaces may be shown in any font, size, color, and so forth.

Various things may be changed visually about the user interfaces without departing from the spirit and scope of this disclosure. While the location indicators are shown as having a circular second portion for profile images, for example, this could be displayed in other shapes such as a square or any other regular or irregular shape.

The systems, applications and methods disclosed herein allow for the inviting of friends, coworkers, associates, followers, followed persons, and so forth to in-person events created within the app/interface. The users are able to easily view events they have been invited to by others. The systems, applications and methods disclosed herein streamline and simplify the process of making in-person plans with others by using a simple map interface with intuitive selectors.

The term "text box" as used herein refers both to interactive text boxes into which a user can enter characters and non-interactive text boxes which display text (or any alphanumeric characters or symbols) but which cannot be modified (or which can be modified on one or more interfaces but which cannot be modified on one or more other interfaces).

In places where the phrase "one of A and B" is used herein, including in the claims, wherein A and B are elements, the phrase shall have the meaning "A and/or B." This shall be extrapolated to as many elements as are recited in this manner, for example the phrase "one of A, B, and C" shall mean "A, B, and/or C," and so forth. To further clarify, the phrase "one of A, B, and C" would include implementations having: A only; B only; C only; A and B but not C; A and C but not B; B and C but not A; and A and B and C.

In places where the description above refers to specific implementations of event organizing systems, software applications, and methods, one or more or many modifications may be made without departing from the spirit and scope thereof. Details of any specific implementation/embodiment described herein may, wherever possible, be applied to any other specific implementation/embodiment described herein. The appended claims are to encompass within their scope all such changes and modifications as are within the true spirit and scope of this disclosure.

Furthermore, in the claims, if a specific number of an element is intended, such will be explicitly recited, and in the absence of such explicit recitation no such limitation exists. For example, the claims may include phrases such as "at least one" and "one or more" to introduce claim elements. The use of such phrases should not be construed to imply that the introduction of any other claim element by the indefinite article "a" or "an" limits that claim to only one such element, and the same holds true for the use in the claims of definite articles.

Additionally, in places where a claim below uses the term "first" as applied to an element, this does not imply that the claim requires a second (or more) of that element—if the claim does not explicitly recite a "second" of that element, the claim does not require a "second" of that element. Furthermore, in some cases a claim may recite a "second" or "third" or "fourth" (or so on) of an element, and this does not necessarily imply that the claim requires a first (or so on) of that element—if the claim does not explicitly recite a "first" (or so on) of that element (or an element with the same name, such as "a widget" and "a second widget"), then the claim does not require a "first" (or so on) of that element.

As used herein, the term "of" may refer to "coupled with." For example, in some cases displays are referred to as a display "of" a first computer or computing device, a display "of" a second computer or computing device, and so forth. These terms are meant to be interpreted broadly so that a display "of" a computing device may be a separate display that is, either by wired or a wireless connection, communicatively coupled with the computing device.

The phrase "computing device" as used herein is meant to include any type of device having one or more processors and capable of communicating information using one or more integrated or communicatively-coupled displays, such as a personal computer, a laptop, a tablet, a mobile phone, a smart phone, a personal data assistant (PDA), smart glasses, a tablet, a smart watch, a smart speaker, a robot, any other human interaction device, and so forth.

It is pointed out that the provider of a software application, to be installed on end user computing devices (such as, by non-limiting example, mobile devices) at least partially facilitates an at least intermittent communicative coupling between one or more servers (which host or otherwise facilitate features of the software application) and the end user computing devices. This is so even if the one or more servers are owned and/or operated by a party other than the provider of the software application.

In implementations wherein this application refers to profile images "of" a user, this includes both photos of the user, non-photo images which resemble the user's actual appearance, and avatar or default or other images which are selected by the user but which do not visually resemble the user.

Method steps disclosed anywhere herein, including in the claims, may be performed in any feasible/possible order. Recitation of method steps in any given order in the claims does not imply that the steps must be recited in that order—such claims are intended to cover the steps performed in any order except any orders which are technically impossible. However, in some implementations method steps may be performed in the order(s) in which the steps are presented herein, including any order(s) presented in the claims.

What is claimed is:

1. An event organizing method, comprising:
   at least partially facilitating an at least intermittent communicative coupling between one or more servers and a first computing device and between the one or more servers and a second computing device;
   initiating displaying, on a display of the first computing device, a map interface and a main location indicator;
   receiving at the one or more servers, from the first computing device, a selection by a first user of a main location for an event selected using one or more selectors displayed on one or more user interfaces displayed on the first computing device; and
   initiating displaying, on a display of the second computing device, a map and the main location indicator, wherein the main location indicator includes a profile image corresponding with the first user.

2. The method of claim 1, wherein the selection by the first user of the main location comprises a dragging motion dragging the main location indicator to the main location on the map interface.

3. The method of claim 1, further comprising receiving, at the one or more servers, from the first computing device, a selection by the first user of a parking location for the event, wherein the parking location is distinct from the main location.

4. The method of claim 1, further comprising receiving, at the one or more servers, from the first computing device, a selection by the first user of an entrance location for the event, wherein the entrance location is distinct from the main location.

5. The method of claim 1, further comprising displaying, on the display of the second computing device, a parking location indicator indicating a parking location for the event and an entrance location indicator indicating an entrance location for the event, wherein the parking location and the entrance location are each distinct from the main location.

6. The method of claim 1, further comprising displaying, on the display of the first computing device, the map and the main location indicator, wherein the main location indicator includes a creator indicator indicating that the first user created the event.

7. The method of claim 1, wherein the main location indicator displayed on the display of the second computing device includes an event title, a pointer, and one of an event date and an event time.

8. The method of claim 1, wherein the main location indicator displayed on the display of the second computing device points to the main location.

9. The method of claim 1, wherein the main location indicator displayed on the display of the second computing device points to an area on the map within which the main location is located in an undisclosed location.

10. The method of claim 9, further comprising displaying, on the display of the second computing device, a reveal time indicator, the reveal time indicator indicating a reveal time at which the main location will be disclosed, the method further comprising, after the reveal time has passed, the main location indicator pointing to the main location on the display of the second computing device.

11. The method of claim 1, further comprising displaying, on a chat interface displayed on the display of the first computing device, a request for one of an event time change and an event location change, along with one or more selectors configured to allow the first user to accept or deny the request.

12. The method of claim 1, wherein the main location indicator displayed on the display of the second computing device simultaneously displays a plurality of profile images corresponding with a plurality of invitees of the event.

13. The method of claim 12, further comprising, in response to one or more user interface interactions, orbiting the plurality of profile images around the profile image corresponding with the first user.

14. The method of claim 12, wherein the main location indicator displayed on the display of the second computing device further displays an indicator indicating a number of invitees of the event whose profile images are not shown by the main location indicator.

15. An event organizing system, comprising:
one or more servers or a portion thereof at least intermittently communicatively coupled with a first computing device and with a second computing device;
one or more user interfaces, at least partly facilitated by the one or more servers or the portion thereof, displayed on a display of the first computing device and including:
a main location indicator configured to allow a first user to select a main location for an event;
one of a parking location indicator configured to allow the first user to select a parking location distinct from the main location and an entrance location indicator configured to allow the first user to select an entrance location distinct from the main location;
one or more selectors configured to allow the first user to select one or more invitees for the event; and
one or more user interfaces, at least partly facilitated by the one or more servers or the portion thereof, displayed on a display of the second computing device and displaying the main location indicator, wherein the main location indicator includes a profile image of the first user.

16. The system of claim 15, wherein the one or more user interfaces displayed on the display of the first computing device further include a visibility selector configured to selectively hide the main location from the one or more invitees until a selected reveal time.

17. The system of claim 15, wherein the one or more user interfaces displayed on the display of the second computing device further displays a selector configured to initiate requesting change of an event time to a requested time and wherein the one or more user interfaces displayed on the display of the first computing device includes a chat interface displaying the requested time, an accept selector configured to automatically change a start time of the event to the requested time upon selection, and a deny selector configured to deny the event time change upon selection.

18. The system of claim 15, wherein the one or more user interfaces displayed on the display of the second computing device further displays a selector configured to initiate requesting change of an event location to a requested location and wherein the one or more user interfaces displayed on the display of the first computing device includes a chat interface displaying the requested location, an accept selector configured to automatically change the main location to the requested location upon selection, and a deny selector configured to deny the event location change upon selection.

19. An event organizing method, comprising:
at least partially facilitating an at least intermittent communicative coupling between one or more servers and a first computing device and between the one or more servers and a second computing device;
displaying, on a display of the first computing device, a map interface and a main location indicator;
receiving at the one or more servers, from the first computing device, a selection by a first user of a main location for an event using one or more selectors displayed on one or more user interfaces displayed on the display of the first computing device;
receiving, at the one or more servers, from the first computing device, a selection by the first user of one of a parking location distinct from the main location and an entrance location distinct from the main location; and
displaying, on a display of the second computing device, a map and, on the map, the main location indicator;
wherein the main location indicator includes a pointer pointing to one of the main location and to an area within which the main location is located in an undisclosed location; and
wherein the main location indicator further includes one of an event title, an event date, and an event time.

20. The method of claim 19, further comprising displaying, on the display of the second computing device, a reveal time indicator, the reveal time indicator indicating a reveal time at which the main location and one of the parking location and the entrance location will be disclosed, and further comprising, after the reveal time has passed, displaying the main location indicator indicating the main location and displaying one of a parking location indicator indicating the parking location and an entrance location indicator indicating the entrance location.

* * * * *

UNITED STATES PATENT AND TRADEMARK OFFICE
CERTIFICATE OF CORRECTION

PATENT NO. : 11,360,658 B2
APPLICATION NO. : 17/452052
DATED : June 14, 2022
INVENTOR(S) : Miles Elliott Carter It is certified that error appears in the above-identified patent and that said Letters Patent is hereby corrected as shown below:

In the Specification

Column 3, Line 39, change "Implementations event" to -Implementations of event-.
Column 4, Line 1, change "FIG. 4 is" to -FIG. 4 shows-.
Column 7, Line 32, change "parking" to -an entrance-.
Column 9, Line 4, change "increased" to -increases-.
Column 9, Line 43, change "readable" to -unreadable-.
Column 12, Lines 25-26, change "or describing" to -or text describing-.
Column 12, Line 64, change "making" to -requesting-.
Column 13, Line 51, change "section" to -second-.
Column 18, Line 17, change "is represented is represented" to -is represented-.
Column 18, Line 66, change "5.0 mile radius, 10.0 mile radius" to -a 5.0 mile radius, a 10.0 mile radius-.
Column 19, Line 2, change "point" to -software-.
Column 21, Line 50, change "may be pinned" to -selector may be pinned-.
Column 21, Line 64, change "lists" to -list-.
Column 23, Line 10, change "on" to -in-.
Column 23, Line 14, change "prioritized" to -organized-.
Column 24, Line 15, change "of" to -off-.

Signed and Sealed this
Second Day of August, 2022

Katherine Kelly Vidal
*Director of the United States Patent and Trademark Office*